(12) United States Patent
Han et al.

(10) Patent No.: US 11,303,805 B2
(45) Date of Patent: Apr. 12, 2022

(54) ELECTRONIC DEVICE FOR COMPRESSING IMAGE BY USING COMPRESSION ATTRIBUTE GENERATED IN IMAGE ACQUISITION PROCEDURE USING IMAGE SENSOR, AND OPERATING METHOD THEREOF

(71) Applicant: SAMSUNG ELECTRONICS CO., LTD., Suwon-si (KR)

(72) Inventors: Changsu Han, Suwon-si (KR); Sungoh Kim, Suwon-si (KR); Youngjo Kim, Suwon-si (KR); Hyunhee Park, Suwon-si (KR); Arang Lee, Suwon-si (KR); Hyungju Chun, Suwon-si (KR); Jongbum Choi, Suwon-si (KR); Hajoong Park, Suwon-si (KR); Donghyun Yeom, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 77 days.

(21) Appl. No.: 16/966,634

(22) PCT Filed: Jan. 31, 2019

(86) PCT No.: PCT/KR2019/001394
§ 371 (c)(1),
(2) Date: Jul. 31, 2020

(87) PCT Pub. No.: WO2019/151808
PCT Pub. Date: Aug. 8, 2019

(65) Prior Publication Data
US 2021/0037182 A1 Feb. 4, 2021

(30) Foreign Application Priority Data
Feb. 2, 2018 (KR) .................. 10-2018-0013628

(51) Int. Cl.
*H04N 5/232* (2006.01)
*G06T 9/00* (2006.01)
(Continued)

(52) U.S. Cl.
CPC ........... *H04N 5/23229* (2013.01); *G06T 9/00* (2013.01); *H04L 65/601* (2013.01); *H04L 67/10* (2013.01); *H04N 5/23206* (2013.01)

(58) Field of Classification Search
CPC .......... H04N 5/23229; H04N 5/23206; H04N 5/23293; H04N 5/3765; H04N 1/41;
(Continued)

(56) References Cited

U.S. PATENT DOCUMENTS

2007/0211798 A1 9/2007 Boyce et al.
2009/0310673 A1 12/2009 Chung
(Continued)

FOREIGN PATENT DOCUMENTS

KR 10-2007-0007326 1/2007
KR 10-2009-0124177 12/2009
(Continued)

OTHER PUBLICATIONS

International Search Report for PCT/KR2019/001394, dated May 17, 2019, 4 pages.
(Continued)

*Primary Examiner* — Christopher K Peterson
(74) *Attorney, Agent, or Firm* — Nixon & Vanderhye, P.C.

(57) ABSTRACT

An electronic device according to various embodiments may comprise: a communication module; an image sensor; a control circuit electrically connected to the image sensor, acquiring a first image and a second image in order by using the image sensor, compressing the first image according to
(Continued)

a first compression scheme by using attribute information generated in relation to an operation of compressing an image acquired before acquisition of the first image, compressing the second image according to the first compression scheme by using first attribute information generated in relation to an operation of compressing the first image, and generating second attribute information in relation to an operation of compressing the second image, and a processor electrically connected to the control circuit and the communication module, wherein the processor is configured to: acquire, from the control circuit, the first image compressed by the first compression scheme and the second image compressed by the first compression scheme, decompress the first image compressed by the first compression scheme and the second image compressed by the first compression scheme, compress the decompressed first image by a second compression scheme by using the first attribute information, compress the decompressed second image by the second compression scheme by using the second attribute information, and transmit the first image compressed by the second compression scheme and the second damage compressed by the second compression scheme, to an external device by using the communication module. Various other embodiments are possible.

15 Claims, 14 Drawing Sheets

(51) Int. Cl.
*H04L 29/06* (2006.01)
*H04L 29/08* (2006.01)
*H04N 5/376* (2011.01)
*H04N 1/41* (2006.01)
*H04N 19/136* (2014.01)
*H04N 19/176* (2014.01)
*H04N 19/184* (2014.01)
*H04N 19/40* (2014.01)
*H04N 19/46* (2014.01)
*H04L 65/60* (2022.01)
*H04L 67/10* (2022.01)

(58) Field of Classification Search
CPC .. H04N 19/136; H04N 19/176; H04N 19/184; H04N 19/40; H04N 19/46; G06T 9/00; H04L 65/601; H04L 67/10; H04L 65/602; H04L 67/2828; H04L 65/607
See application file for complete search history.

(56) References Cited

U.S. PATENT DOCUMENTS

| 2015/0271356 | A1* | 9/2015 | Terada | H04N 19/50 |
| | | | | 348/231.99 |
| 2015/0365688 | A1 | 12/2015 | Su et al. | |
| 2016/0173910 | A1 | 6/2016 | Park et al. | |
| 2016/0247249 | A1* | 8/2016 | Harris | G06T 15/005 |
| 2018/0324438 | A1 | 11/2018 | Kwak | |

FOREIGN PATENT DOCUMENTS

| KR | 10-1033442 | 5/2011 |
| KR | 10-2016-0070674 | 6/2016 |
| KR | 10-2017-0141390 | 12/2017 |

OTHER PUBLICATIONS

Written Opinion of the ISA for PCT/KR2019/001394, dated May 17, 2019, 4 pages.

* cited by examiner

FIG.7

| 1 | 1 | 1 |
|---|---|---|
| 1 | 1 | 1 |
| 1 | 2 | 1 |
| 2 | 2 | 2 |
| 1 | 1 | 1 |
| 1 | 1 | 1 |
| 2 | 2 | 2 |
| 3 | 4 | 4 |

FIG.8

| 1 | 1 | 1 |
|---|---|---|
| 1 | 1 | 1 |
| 1 | 2 | 1 |
| 2 | 2 | 2 |
| 1 | 1 | 1 |
| 1 | 1 | 1 |
| 2 | 1 | 1 |
| 1 | 1 | 1 |

FIG.9

| 2 | 1 | 1 |
|---|---|---|
| 1 | 1 | 1 |
| 1 | 2 | 1 |
| 2 | 1 | 2 |
| 1 | 2 | 1 |
| 1 | 2 | 1 |
| 2 | 3 | 2 |
| 3 | 2 | 4 |

ELECTRONIC DEVICE FOR COMPRESSING IMAGE BY USING COMPRESSION ATTRIBUTE GENERATED IN IMAGE ACQUISITION PROCEDURE USING IMAGE SENSOR, AND OPERATING METHOD THEREOF

This application is the U.S. national phase of International Application No. PCT/KR2019/001394 filed 31 Jan. 2019, which designated the U.S. and claims priority to KR Patent Application No. 10-2018-0013628 filed 2 Feb. 2018, the entire contents of each of which are hereby incorporated by reference.

1. FIELD

The disclosure generally relates to an electronic device that compresses an image using a compression attribute generated during an image acquisition procedure performed using an image sensor, and an operation method thereof.

2. DESCRIPTION OF RELATED ART

An electronic device that processes an image may acquire a raw image using an image sensor, and may process the acquired raw image using an embedded image signal processor (ISP). The image signal processor may process a received raw image using an image quality improvement algorithm, and thus may provide an image with improved image quality. An image processor may perform various processing, such as white balance adjustment, color adjustment (e.g., color matrix, color correction, or color enhancement), color filter array interpolation, noise reduction processing or sharpening, image enhancement (e.g., high-dynamic-range (HDR) processing, face detection, or the like), or the like. An image output from the image signal processor may be provided, for example, in a YUV format.

A service provided by an image-processing cloud system is provided in order to back up images and to generate new media content. Computer-vision-based technology which is difficult to perform in a terminal, such as an image-matching scheme or the like, may be applied to an image uploaded to a cloud server. For example, the cloud server may perform image recognition using machine-learning-based software.

The transmission speed of an interface used for transmitting an image from a camera module of an electronic device to a processor may be lower than the transmission speed for an image with high image quality, and thus the camera module may primarily compress the image and may transmit the same to the processor. To enable a processor of the electronic device or a processor of a cloud server to process a raw high-quality image, the raw image may be transmitted from the electronic device to the cloud server. After decompressing the primarily compressed image, the processor may secondarily compress the raw image in order to transmit the raw image to the cloud server. However, since compression is performed two or more times, the amount of resources allocated for compression and the amount of time spent on compression may increase.

According to an aspect of the disclosure, there are provided an electronic device capable of using at least a part of information that is generated when primary image compression is performed for secondary image compression, and an operation method thereof.

In accordance with an aspect of the disclosure, an electronic device may include: a communication module; an image sensor; a control circuit, electrically connected to the image sensor and configured to sequentially acquire a first image and a second image using the image sensor, to compress the first image by a first compression scheme using attribute information generated in relation to compressing an image acquired before acquisition of the first image, to compress the second image by the first compression scheme using first attribute information generated in relation to compressing the first image, and to generate second attribute information in relation to compressing the second image, and a processor electrically connected to the control circuit and the communication module, wherein the processor is configured to: acquire, from the control circuit, the first image compressed by the first compression scheme and the second image compressed by the first compression scheme, decompress the first image compressed by the first compression scheme and the second image compressed by the first compression scheme, compress the decompressed first image by a second compression scheme using the first attribute information, compress the decompressed second image by the second compression scheme using the second attribute information, and transmit the first image compressed by the second compression scheme and the second image compressed by the second compression scheme to an external device using the communication module.

In accordance with an aspect of the disclosure, an operation method of an electronic device may include: receiving a first image and a second image sequentially acquired using an image sensor; compressing the first image by a first compression scheme using attribute information generated in relation to compressing an image acquired before acquisition of the first image, compressing the second image by the first compression scheme using first attribute information generated in relation to compressing the first image, and generating second attribute information in relation to compressing the second image; receiving, by a processor of the electronic device, the first image compressed by the first compression scheme and the second image compressed by the first compression scheme, from the image sensor; decompressing the first image compressed by the first compression scheme and the second image compressed by the first compression scheme; compressing the decompressed first image by a second compression scheme using the first attribute information generated in relation to compressing the first image, and compressing the decompressed second image by the second compression scheme using the second attribute information generated in relation to compressing the second image; and transmitting the first image compressed by the second compression scheme and the second image compressed by the second compression scheme to an external electronic device using the communication module.

In accordance with an aspect of the disclosure, an electronic device may include: an image sensor; a communication module; a control circuit electrically connected to the image sensor and configured to compress an image acquired by the image sensor by a first compression scheme, and to generate first data including the compressed image and attribute information associated with the image which is generated in relation to the compression; and a processor electrically connected to the control circuit and the communication module, and configured to acquire the first data from the control circuit, to separate the first data into the attribute information and the compressed image, to decompress the compressed image, to compress the decompressed image to be smaller than the image compressed by the first compression scheme, by a second compression scheme using the attribute information, and to transmit the image compressed by the second compression scheme to an external device using the communication module.

According to various embodiments, there are provided an electronic device that performs dual compression of a raw image acquired from a camera in order to process the raw image, and transmits the compressed image to a cloud server, and an operation method thereof.

According to various embodiments, the processor can perform secondary compression using attribute information, which is generated when a camera performs primary compression, and thus can increase the efficiency of compression.

BRIEF DESCRIPTION OF DRAWINGS

FIG. 7 is a diagram illustrating an example of the complexity of an image according to various embodiments;

FIG. 8 is a diagram illustrating another example of the complexity of an image according to various embodiments;

FIG. 9 is a diagram illustrating another example of the complexity of an image according to various embodiments;

DETAILED DESCRIPTION

Figure 1:
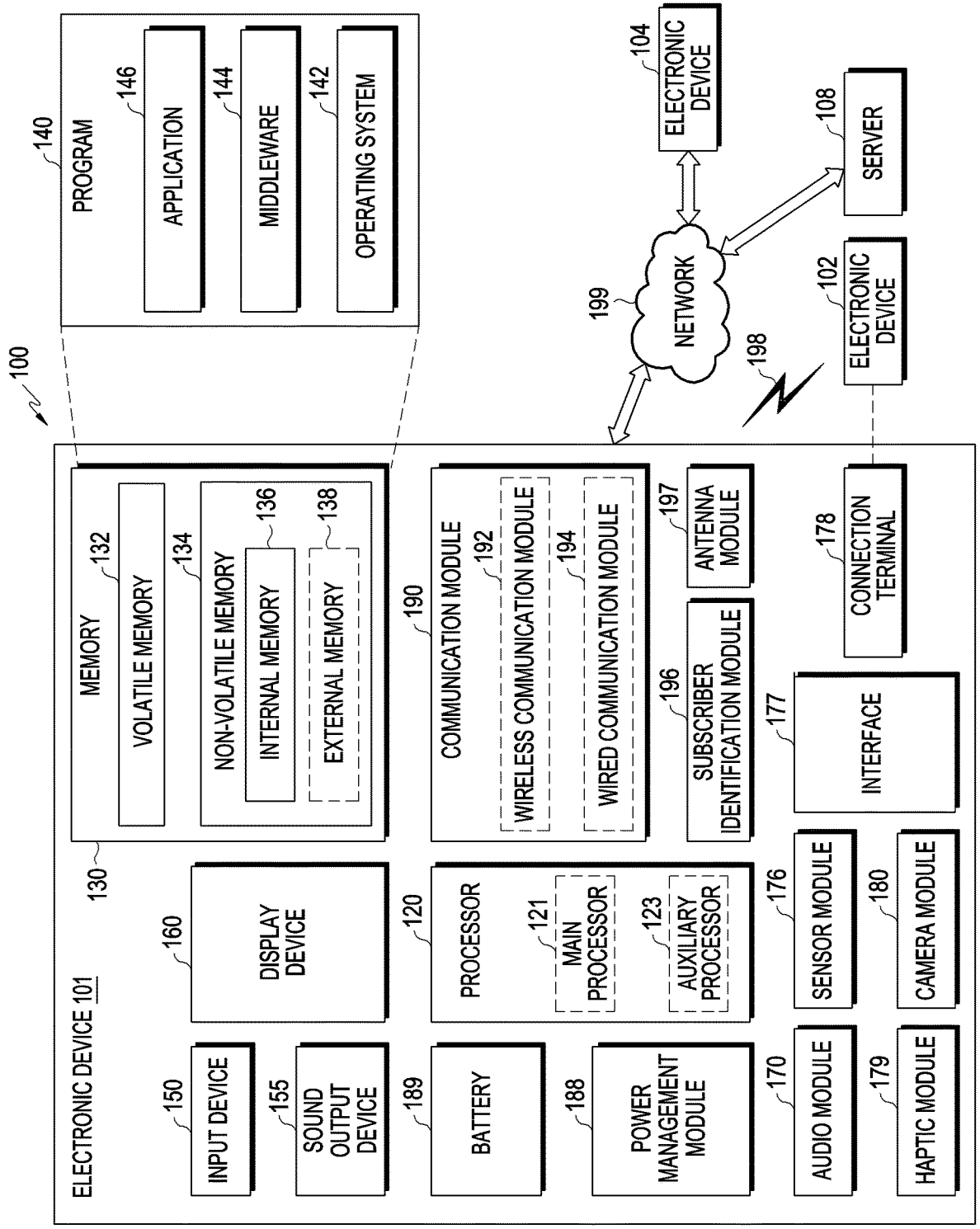
FIG. 1 is a block diagram of an electronic device 101 in a network environment 100 according to various embodiments.

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented integrated and implemented as in, for example, the sensor module 176 (e.g., a fingerprint sensor, an iris sensor, or an illuminance sensor) embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing and computation. The processor 120 may load and process a command or data received from another component (e.g., the sensor module 176 or the communication module 190) in volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from the main processor 121. Additionally or alternatively, the auxiliary processor 123 may be adapted to consume less power than the main processor 121, or to be specific to a specified function. Here, the auxiliary processor 123 may be operated separately from or embedded in the main processor 121.

In such a case, the auxiliary processor 123 may control, for example, at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active (e.g., executing an application) state. According to an embodiment, the auxiliary processor 123 (e.g., an image signal processor or a communication processor) may be implemented as part of another component (e.g., the camera module 180 or the communication module 190) functionally related to the auxiliary processor 123. The memory 130 may store various data used by at least one component (e.g., the processor 120 or the sensor module 176) of the electronic device 101, for example, software (e.g., the program 140) and input data or output data for a command related thereto. The memory 130 may include the volatile memory 132 or the non-volatile memory 134.

The program 140 is software stored in the memory 130, and may include, for example, an operating system (OS) 142, middleware 144, or an application 146.

The input device 150 is a device configured to receive a command or data to be used by a component (e.g., the processor 120) of the electronic device 101, from the outside (e.g., a user) of the electronic device 101, and may include, for example, a microphone, a mouse, or a keyboard.

The sound output device 155 is a device configured to output sound signals to the outside of the electronic device 101, and may include, for example, a speaker or a receiver. The speaker may be used for general purposes, such as playing multimedia or playing record, and the receiver may be used only for incoming calls. According to an embodiment, the receiver may be implemented as separate from, or as part of the speaker.

The display device 160 is a device configured to visually provide information to a user of the electronic device 101, and may include, for example, a display, a hologram device, or a projector and control circuitry to control a corresponding one of the display, hologram device, and projector. According to an embodiment, the display device 160 may include touch circuitry or a pressure sensor adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or an external electronic device (e.g., an electronic device 102 (e.g., a speaker or a headphone)) wiredly or wirelessly coupled with the electronic device 101.

The sensor module 176 may generate an electrical signal or data value corresponding to an internal operational state (e.g., power or temperature) of the electronic device 101 or an environmental state external to the electronic device 101. The sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support specified protocols to be used for the electronic device 101 to be coupled with the external electronic device (e.g., the electronic device 102) wiredly or wirelessly. According to an embodiment, the interface 177 may include a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102), for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. The haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 is a module configured to manage power supplied to the electronic device 101, and may be implemented as at least part of, for example, a power management integrated circuit (PMIC).

The battery 189 is a device configured to supply power to at least one component of the electronic device 101, and may include, for example, a primary cell which is not rechargeable, a secondary cell which is rechargeable, or a fuel cell.

The communication module 190 may support establishing a wired communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a wired communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules 190 may be implemented as a single chip or may be implemented as separate chips, respectively.

According to an embodiment, the wireless communication module 192 may identify and authenticate the electronic device 101 in a communication network, using user information stored in the subscriber identification module 196.

The antenna module 197 may include at least one antenna module for transmitting or receiving a signal or power to or from the outside of the electronic device 101. According to an embodiment, the communication module 190 (e.g., the wireless communication module 192) may transmit or receive a signal to or from the external electronic device via an antenna appropriate for a communication scheme.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices. According to an embodiment, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the function requested or an additional function, and transfer an outcome of the performing to the electronic device 101. The electronic device 101 may provide the function or service requested, with or without further processing of the received outcome. To that end, a cloud computing, distributed computing, or client-server computing technology may be used, for example.

Figure 2:
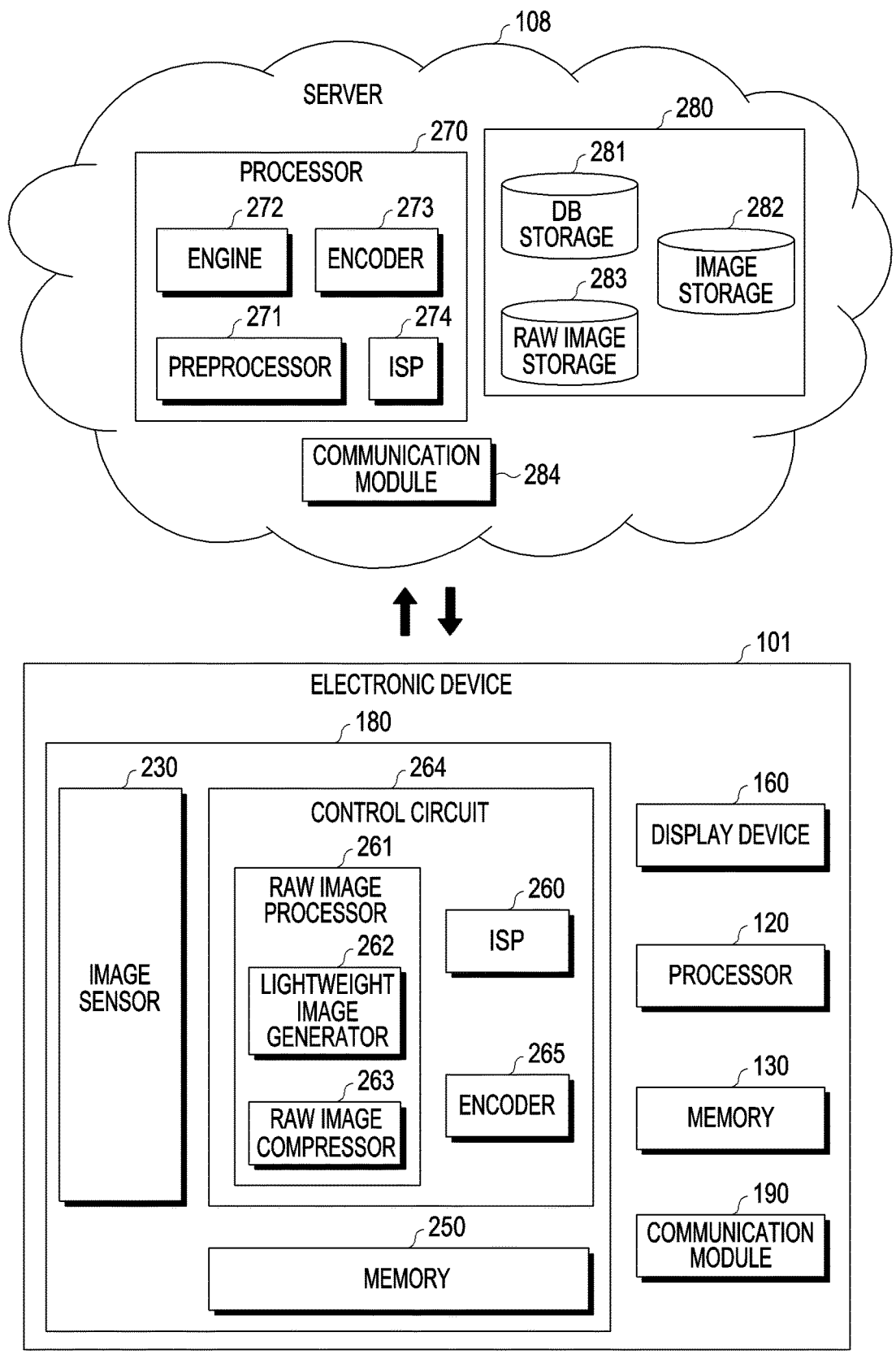
FIG. 2 is a block diagram of an electronic device and a server according to various embodiments.

FIG. 2 is a block diagram of an electronic device and a server according to various embodiments.

Referring to FIG. 2, according to various embodiments, the electronic device 101 may include the processor 120, the memory 130, the display device 160, the camera module 180, and the communication module 190. The server 180 may include a processor 270, a memory 280, and a communication module 284. According to various embodiments, the camera module 180 may include an image sensor 230, a control circuit 264, and a memory 250. The control circuit 264 may include a raw image processor 261, an ISP 260, and an encoder 265. The raw image processor 261 may include a lightweight image generator 262 and a raw image compressor 263. The processor 270 may include a preprocessor 271, an engine 272, an encoder 273, and an ISP 274. The memory 280 may include a database storage 281, an image storage 282, and a raw image storage 283.

According to various embodiments, the image sensor 230 may acquire a raw image of a subject which is provided in one of the various formats. For example, the image sensor 230 may acquire a raw image provided in one of the various formats depending on a color filter array (CFA) pattern. If the image sensor 230 includes a dual-pixel structure (or 2 photodiodes (2PD) structure), the image sensor 230 may acquire a raw image that has different phase difference (or disparity) information for a single pixel. Alternatively, the image sensor 230 may include a plurality of image sensors which have the same or different characteristics. For example, the image sensor 230 may include a dual sensor (e.g., an RGB sensor+an RGB sensor, an RGB sensor+a monochrome (mono) sensor, or a wide sensor+a telephoto (tele) sensor, and the like), or an array sensor including a plurality of sensors. In this instance, the image sensor 230 may acquire one or more raw images for a single scene. An acquired raw image may be stored in the memory 130 or the memory 250 as it is, or after being subjected to additional processing.

According to various embodiments, the image sensor 230 may acquire a raw image provided in one of the various formats. For example, if a raw image is provided in a Bayer format, a pixel of the raw image may be expressed as one of red, green, and blue, and may be expressed at a depth of 8 to 16 bits (bit-depth). For example, a CFA pattern may be applied to a raw image. A raw image may have a layer structure including various color information (e.g., a plurality of colors among red, green, and blue) for a single pixel. The image sensor 230 may acquire, for example, a raw image, including phase difference information and the like, in addition to color information (RGB information). Metadata of information associated with image capture (e.g., a capture time, a capture site, and illumination) may be stored in relation to a raw image. The control circuit 264 may perform simple processing with respect to a raw image acquired by the image sensor 230. According to various embodiments, the control circuit 264 may compress a raw image, and may transmit the compressed raw image to the processor 120. The control circuit 264 may acquire a first image and a second image, obtained as an image subsequent to the first image, using the image sensor 230, and may compress the first image according to a first compression scheme using attribute information generated in relation to compressing an image preceding the first image. The control circuit 264 may compress the second image according to the first compression scheme using first attribute information generated in relation to compressing the first image, and may generate second attribute information in relation to compressing the second image. The control circuit 264 may transmit, to the processor 120, the compressed first image, the compressed second image, the first attribute information generated in relation to compressing the first image, and the second attribute information generated in relation to compressing the second image. This will be described in detail below.

According to various embodiments, the control circuit 264 may perform various processes related to image processing of a raw image received from the image sensor 230. The control circuit 264 may be implemented as a single independent processor, or may be included in another processor (e.g., the processor 120). At least one of the lightweight image generator 262, the raw image compressor 263, the ISP 260, or the encoder 265 of the control circuit 264 may be included in another processor (e.g., the processor 120). The control circuit 264 may be implemented inside the camera module 180 or outside the camera module 180 (e.g., the electronic device 101 or the server 108), or may be implemented inside and outside the camera module 180. A process performed by the processor 120 may be processed solely by the processor 120, or may be processed in a distributed manner by a plurality of processors. According to various embodiments, the processor 120 may receive a compressed image and attribute information associated with the compressed image from the control circuit 264, and may decompress the received compressed image according to the first compression scheme used by the control circuit 264 for compression. In this instance, decompressing, by the processor 120, the image that has been compressed according to the first compression scheme may also be performed by a decoder (not illustrated) that uses the first compression scheme. Based on the received attribute information, the processor 120 may compress the decompressed image again according to a second compression scheme, which is different from the first compression scheme used by the control circuit 264 for compression. In this instance, an encoder (not illustrated) that uses the second compression scheme of the processor 120 may compress the image according to the second compression scheme. The processor 120 may transmit the image compressed according to the second compression scheme to the server 108 using the communication module 190, which will be described in detail later.

According to various embodiments, the raw image processor 261 of the control circuit 264 may perform various processing with respect to a raw image acquired from the image sensor 230. For example, the raw image processor 261 may perform lens calibration with respect to a raw image, or may remove at least a part of noise. The lightweight image generator 262 may generate a lightweight image smaller than the size of a raw image, using the raw image. The size of the raw image may be relatively large, and thus, the lightweight image generator 262 may generate a lightweight image that is smaller than the size of the raw image before storing, processing or transmitting the raw image. For example, the lightweight image generator 262 may perform various processing, such as downscaling, downsampling, compression, and the like, and may generate a lightweight image using the raw image. Downscaling may be, for example, processing that lowers the size or the resolution of a raw image. Downsampling may be, for example, processing that generates a lightweight image by selecting one or some of a plurality of samples. The raw image compressor 263 may compress a raw image or a lightweight image using various image compression algorithms, and the compression scheme is not limited.

The image signal processor 260 may perform image processing on an image acquired by the image sensor 230 or an image stored in the memory 250. The encoder 265 may encode a raw image so as to generate an encoded image. The encoded image may be provided in one of various formats, for example, a joint photographic coding experts group (JPEG) format, a moving picture experts group (MPEG) format, a 360 degree-image format, or the like.

According to various embodiments, at least one of a raw image, a lightweight image, a compressed image, or an encoded image may be temporarily or non-temporarily stored in the memory 250. The processor 120, for example, may transmit at least one of a raw image or a compressed image to the server 108 via the communication module 190. The server 108 may receive at least one of a raw image or a compressed image via the communication module 290. The communication module 290, for example, may perform communication with the communication module 190. The server 108 may perform network management associated with the electronic device 101, may perform service management related to providable services, authority, and the like, may perform storage management, and the like. A raw image may be stored in the raw image storage 283 in the server 108, either temporarily or non-temporarily.

According to various embodiments, the preprocessor 271 may perform processing that is required before transferring a received raw image to the engine 272 or the ISP 274. For example, if a compressed raw image is received via the compression module 290, the preprocessor 271 may decompress the compressed raw image and may obtain a raw image. Alternatively, the preprocessor 271 may receive a raw image via the compression module 290. The preprocessor 271 may perform at least one task among applying an image quality improvement algorithm, de-mosaic processing, or image format conversion, on a raw image acquired via decompression or a received raw image.

According to various embodiments, the engine 272 may analyze a raw image (or an image file), and may perform various tasks (e.g., object recognition, speed vector determination, face recognition, segmentation, scene parsing, or texture recognition). The engine 272 may use various algorithms for performing the various tasks described above. The server 108 according to various embodiments may have a relatively high operation capability, a relatively large storage capacity, or a relatively large amount of resources, and thus may be capable of using an algorithm that requires a large amount of operations, and may also be capable of using a newly developed algorithm. As a result of performing various tasks, the engine 272 may generate, store, or transmit information (e.g., recipe information (e.g., information including an object recognition result, a speed vector, a face recognition result, a segmentation result, a scene category, or information associated with texture)) which may be usable when the ISP 274 performs various image processing.

According to various embodiments, the ISP 274 may perform various image processing on a raw image using various information (e.g., recipe information) associated with a raw image analyzed by the engine 272. According to another embodiment, the electronic device 101 may receive recipe information, and may perform image processing using the received recipe information. In this instance, the electronic device 101 may perform image processing provided by the ISP 260 and image processing based on recipe information. The electronic device 101 may temporarily or non-temporarily store a processed image in the memory 130, or may display the processed image in the display device 160. As described above, in the case in which the ISP 274 performs image processing, the ISP 274 may perform image processing based on recipe information. The ISP 274 may receive additional information (e.g., feature vector) corresponding to recipe information from the database storage 281, and may use the same for image processing. In the database storage 281, various pieces of feature information corresponding to an image category and the like may be stored. A processed image may again be transmitted to the electronic device 101, or may be stored in the image storage 282 of the server 108. Based at least on recipe information, the ISP 274 may perform various processing such as white balance adjustment, color adjustment (e.g., color matrix, color correction, or color enhancement), color filter array interpolation, noise reduction processing or sharpening, image enhancement (e.g., high-dynamic-range (HDR), face detection, or the like), or the like. In addition, the ISP 274 may perform image processing that requires a large amount of operations, such as original color mapping, detail regeneration, text reconstruction, image inpainting, or the like.

According to various embodiments, the server 108 may be a cloud server. The server 108 may perform network management associated with an electronic device (e.g., the electronic device 101) that is capable of being connected to the server 108, may perform cloud service management related to providable services, authority, and the like, and may perform storage management and the like.

Figure 3:
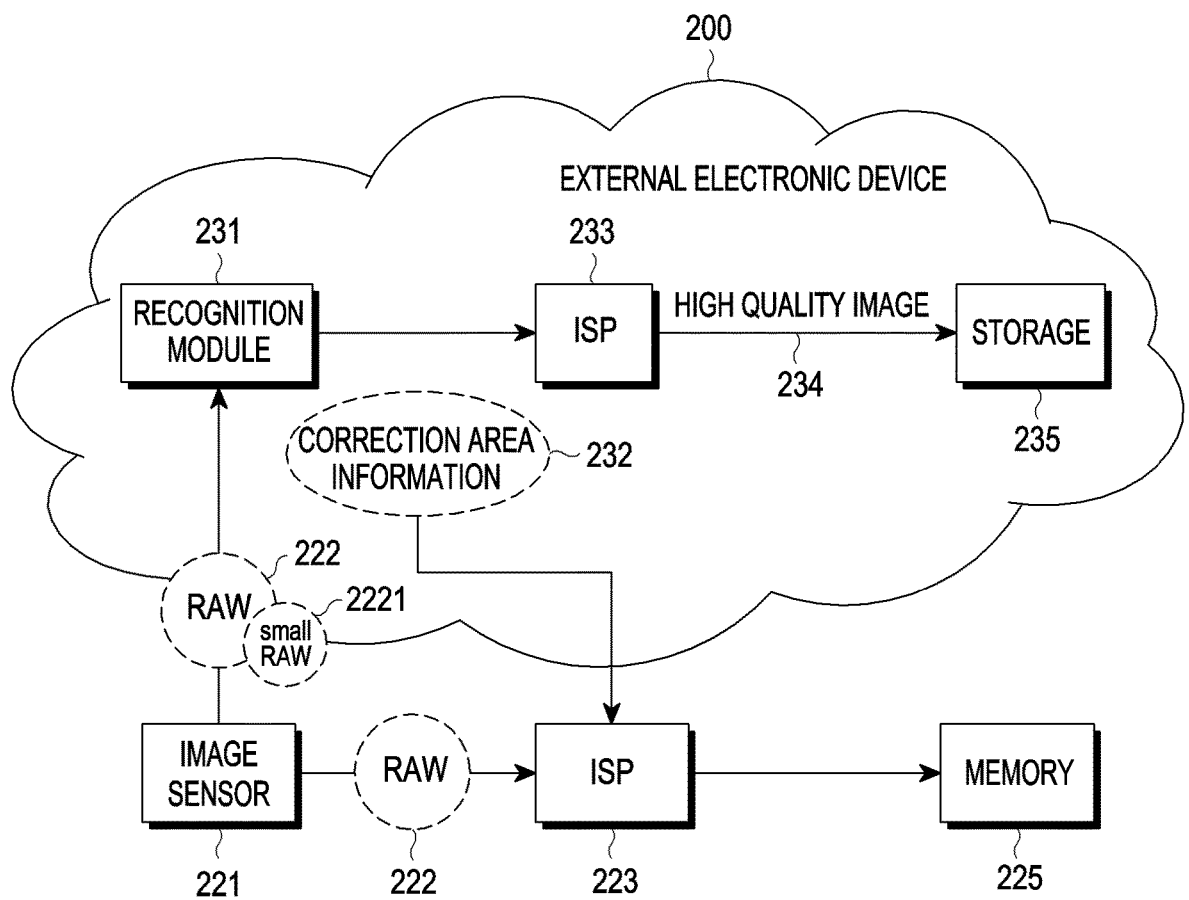
FIG. 3 is a conceptual diagram illustrating the operation of an electronic device and an external electronic device according to various embodiments.

FIG. 3 is a conceptual diagram illustrating the operation of an electronic device and an external electronic device according to various embodiments.

The electronic device (e.g., the electronic device 101 of FIG. 1) may include an image sensor 221, an ISP 223, and a memory 225. An external electronic device 200 (e.g., the electronic device 104 or the server 108 of FIG. 1) may include a recognition module 231, an ISP 233 (e.g., the ISP 274 of FIG. 2), and a storage 235 (e.g., the memory 280 of FIG. 2). The recognition module 231 may be a logical module, and may be implemented as a processor (e.g., the processor 270 of FIG. 2) of the external electronic device 200. The ISP 233 may also be implemented as the processor 270 of the external electronic device 200. For example, the processor 270 of the external electronic device 200 may perform both recognition and image processing. Although not illustrated, the electronic device 101 may include a communication module (e.g., the communication module 190 of FIG. 2) that is capable of performing data transmission or reception with the external electronic device 200. The external electronic device 200 may include a communication module (e.g., the communication module 284 of FIG. 2) that is capable of performing data transmission or reception with the electronic device 101.

The image sensor 221 (e.g., the image sensor 230 of FIG. 2) may acquire an image of an external object, and may generate a raw image 222 corresponding thereto. The image sensor 221 may transfer the raw image 222 to the ISP 223. According to various embodiments, the image sensor 221 may generate a small raw image 2221, and may transmit the same to the external electronic device 200 via a communication module. According to another embodiment, the processor of the electronic device 101 (e.g., the processor 120 of FIG. 1), rather than the image sensor 221, may generate the small raw image 2221, and may transmit the generated small raw image 2221 to the external electronic device 200 via a communication module.

The recognition module 231 of the external electronic device 200 may acquire the small raw image 2221 via the communication module 284, and may segment the small raw image 2221 into at least one image area. The recognition module 231 may recognize the at least one image area separated by the segmentation. Correction area information 232 including information associated with a plurality of image areas generated from the recognition module 231, for example, at least one of coordinate information or a result of recognition of an image area, may be generated. The correction area information 232 may be transmitted to the electronic device 101. The ISP 223 may correct the raw image 222 using the correction area information 232, and thus a corrected image 224 may be generated. For example, a corrected image may be provided in the YUV format. A corrected image may be stored in the memory 225. Alternatively, a corrected image may, for example, be compressed according to a JPEG scheme, and the compressed image may be stored in the memory 225.

According to various embodiments, the raw image 222 provided from the image sensor 221 may be transmitted to the external electronic device 200 separately from the small raw image 2221. The raw image 222 has a larger size than the small raw image 2221, and thus the small raw image 2221 may be preferentially transmitted to the external electronic device 200, after which the raw image 222 may be transmitted to the external electronic device 200. For example, while the ISP 223 corrects the raw image 222, the raw image 222 may be transmitted to the external electronic device 200. The raw image 222, generated by the image sensor 221, may be uploaded to the external electronic device 200 as it is, or a preprocessed image which is obtained after lens calibration or noise removal is performed may be uploaded. The above-mentioned preprocessing may be performed in the external electronic device 200. The external electronic device 200 may perform de-mosaic processing or image format conversion, or may perform preprocessing in order to increase an image recognition rate. The ISP 233 of the external electronic device 200 may correct the received raw image 222. The external electronic device 200 may correct the raw image 222 using the correction area information 232 generated in advance, or may correct the raw image 222 using extended correction area information. The raw image 222 may have a higher resolution than the small raw image 2221, and thus, the ISP 233 of the external electronic device 200 may acquire more detailed and extended correction area information from a high-quality image. The ISP 233 may generate extended correction area information using the previously generated correction area information and the raw image 222 together. The ISP 233 may correct the raw image 222 using the extended correction area information, and may acquire a high-quality image 234. The high-quality image 234 may be stored in the storage 235 of the external electronic device 200, or may be downloaded to the electronic device 101.

Figure 4:
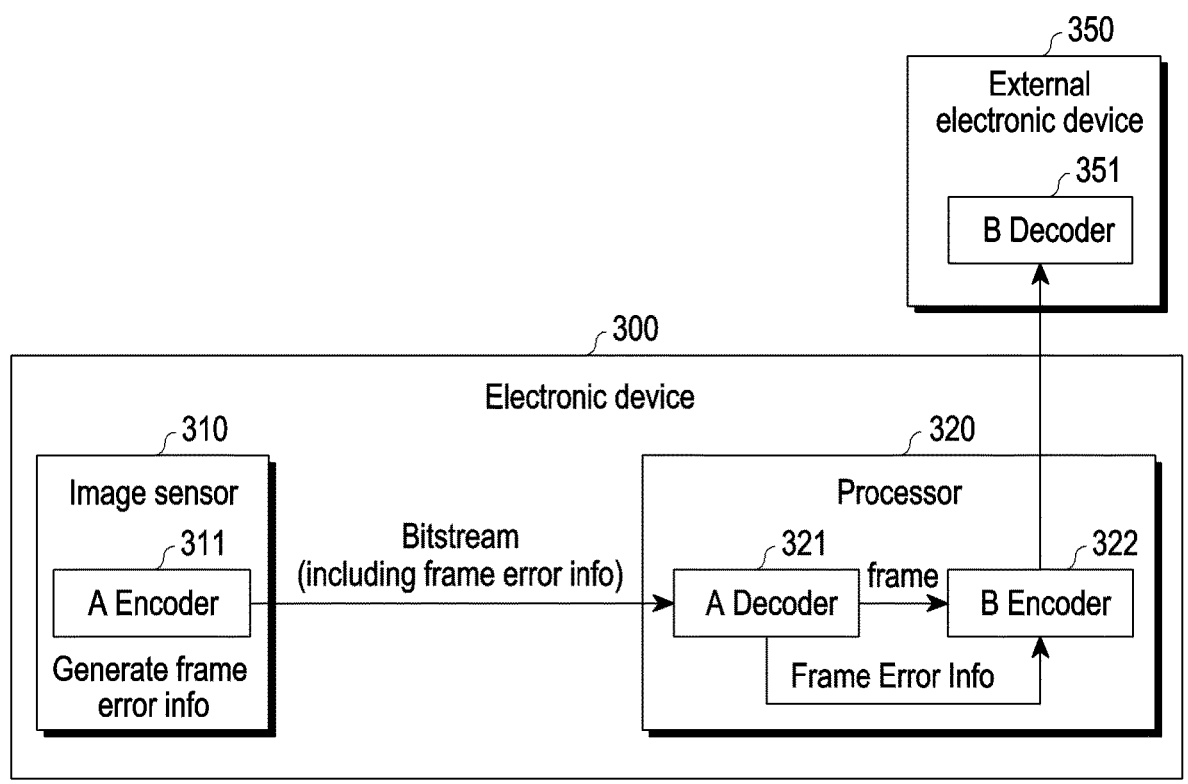
FIG. 4 is a conceptual diagram illustrating the operation of an electronic device and an external electronic device according to various embodiments.

FIG. 4 is a conceptual diagram illustrating the operation of an electronic device and an external electronic device according to various embodiments.

According to various embodiments, an electronic device 300 (e.g., the electronic device 101 of FIG. 1) may include an image sensor 310 (e.g., the image sensor 230 of FIG. 2) and a processor 320 (e.g., the processor 120 of FIG. 2). The image sensor 310 may include an A encoder 311 (e.g., the encoder 265 of FIG. 2), and the A encoder 311 may compress an image, acquired by the image sensor 310, according to a compression scheme A. The A encoder 311 may generate attribute information associated with the image in relation to compressing the image according to compression scheme A. The image sensor 310 may acquire an image in units of frames, and the acquired image may be a still image or a video. The image acquired by the image sensor 310 may be a frame. The attribute information generated by the A encoder 311 may be frame error information associated with a frame error occurring when compression is performed according to the compression scheme A. According to various embodiments, while compressing a plurality of areas (e.g., blocks) included in a first image in units of blocks, the A encoder 311 may obtain information associated with a deleted bit plane for each of the plurality of blocks of the first image. The A encoder 311 may determine the complexity of each of the plurality of blocks based on the information associated with the deleted bit plane in association with the plurality of blocks. For example, if a large amount of information associated with a deleted bit plane is present, the corresponding block may have low complexity. According to various embodiments, the A encoder 311 may compress a plurality of blocks included in the first image in units of blocks, and may obtain information associated with bit allocation for each of the plurality of blocks included in the first image. The A encoder 311 may determine the complexity of each of the plurality of blocks based on the number of bits allocated to each of the plurality of blocks included in the first image for compression. For example, if the number of bits allocated to a first block is larger than the number of bits allocated to a second block, the complexity of the first block may be higher than the complexity of the second block. The A encoder 311 may use complexities of a plurality of blocks included in an image acquired before the first image is acquired in order to compress the plurality of blocks included in the first image. This will be described in detail later with reference to FIG. 10.

According to various embodiments, the A encoder 311 may transmit a bitstream including the compressed image and the attribute information associated with the compressed image to the processor 320. The A encoder 311 may compress a raw image, and may transmit the same to the processor 320, and thus a bus bandwidth between the image sensor 310 and the processor 320 may be secured, and a large number of raw images may be stored in a memory (e.g., DRAM). The compression rate of the A encoder 311 may be a maximum of 2:1.

According to various embodiments, the processor 320 may receive the bitstream including the compressed image and the attribute information associated with the compressed image from the image sensor 310. The processor 320 may include an A decoder 321 for decompressing the compressed image compressed by the A encoder 311, and may include a B encoder 322 for again compressing the decompressed image in order to transmit the image to an external electronic device 350 (e.g., the electronic device 104 or the server 108 of FIG. 1, or the external electronic device 200 of FIG. 3). The A decoder 321 may separate, from the compressed image, the attribute information associated with the compressed image included in the received bitstream. The A decoder 321 may separate compressed image data and attribute information data from header information included in the bitstream. For example, the A decoder 321 may include a parser (or a parsing module) that is capable of separating a header and image data. The bitstream may include the header for the compressed image data and the header for the attribute information. This will be described in detail later with reference to FIGS. 14 and 15. The A decoder 321 may decompress the compressed image, and may transmit the decompressed image and attribute information associated with the decompressed image to the B encoder 322.

According to various embodiments, the B encoder 322 may compress the decompressed image according to a compression scheme B using the attribute information associated with the decompressed image. The attribute information associated with the decompressed image may include complexity information associated with a plurality of areas (e.g., blocks) included in the image. For example, the B encoder 322 may compress the first image based on complexity information associated with the plurality of blocks included in the first image. Unlike the A encoder 311, the B encoder 322 may allocate bits to each of the plurality of blocks using complexity information associated with the plurality of blocks included in the first image, and thus a larger number of bits may be allocated to a block having higher complexity. Accordingly, deterioration in the image quality of a high-quality image may be prevented. Particularly, the B encoder 322 may use the frame error information of the A encoder 311 without analyzing the first image. Accordingly, the amount of resources and time required for the B encoder 322 to analyze the first image may be decreased, and the amount of resources and time required for compression performed two times may be reduced. This will be described in detail later with reference to FIG. 11. According to various embodiments, the B encoder may not generate complexity information about a block included in an image while performing compression according to the compression scheme B. The B encoder 322 may determine the compression rate of the compression scheme B based on the data transmission speed of a communication module (e.g., the communication module 190 of FIG. 1) for transmitting a compressed image to the external electronic device 350. For example, if the speed of the data transmission between the electronic device 300 and the external electronic device 350 is low, the B encoder 322 may compress an image based on a high compression rate. The amount of data transmission and the data transmission speed may be directly related to data transmission costs. As the size of a compressed image is smaller, more efficient data transmission may be performed. According to various embodiments, the compression rate of the B encoder 322 may be higher than the compression rate of the A encoder 311.

According to various embodiments, the external electronic device 350 may receive the image compressed according to the compression scheme B from the electronic device 300 using a wireless communication module. The external electronic device 350 may include a B decoder 351 for decompressing the received compressed image.

Figure 5:
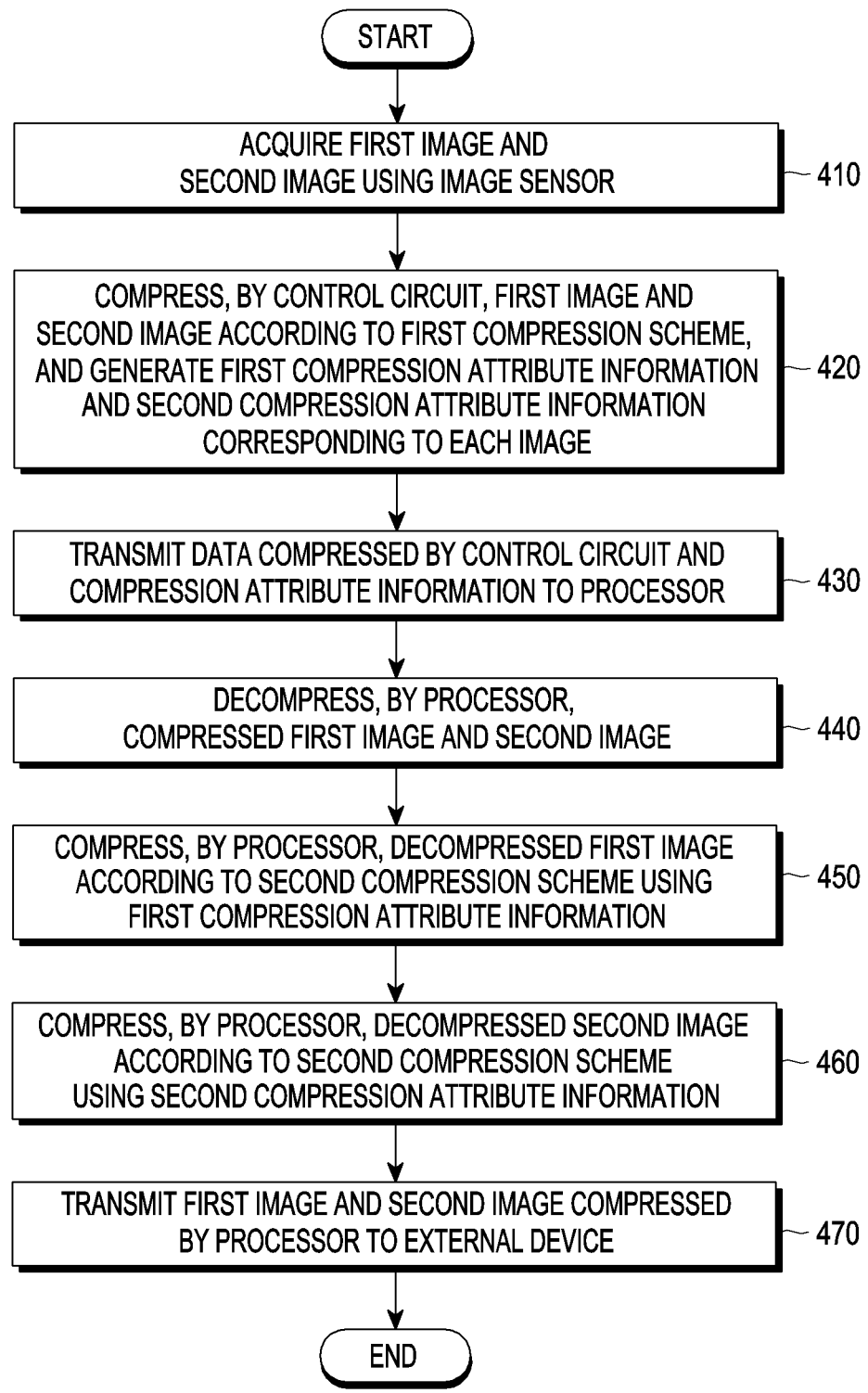
FIG. 5 is a flowchart illustrating an operation method of an electronic device according to various embodiments.

FIG. 5 is a flowchart illustrating an operation method of an electronic device according to various embodiments.

Referring to FIG. 5, according to various embodiments, the electronic device (e.g., the electronic device 101, the control circuit 264, or the processor 120 of FIG. 2) may receive a first image and a second image, acquired as the image subsequent to the first image, using an image sensor (e.g., the image sensor 230 of FIG. 2) in operation 410. The second image may correspond to the image subsequent to the first image, which the image sensor 230 captures in chronological order.

In operation 420, the electronic device 101 may compress the first image according to a first compression scheme, using attribute information generated in relation to compressing the image preceding the first image, via a control circuit (e.g., the control circuit 264 of FIG. 2). According to various embodiments, the attribute information may be compression information. The electronic device 101 may compress the second image according to the first compression scheme, using first attribute information generated in relation to compressing the first image, via the control circuit (e.g., the control circuit 264 of FIG. 2). The electronic device 101 may generate second attribute information in relation to compressing the second image using the control circuit (e.g., the control circuit 264 of FIG. 2). The first compression scheme may be determined based on the type of encoder included in the control circuit 264, and various modifications thereof may be applicable in various embodiments. For example, the first compression scheme may be sensor data compression (SDC) encoding.

The second attribute information may include complexity information associated with each of a plurality of blocks included in the second image. According to various embodiments, the electronic device 101 may compress the first image using the complexity information associated with the image preceding the first image, and may compress the second image using the complexity information associated with the first image, which is the image preceding the second image. There is a high probability that subjects included in successively captured images will be similar to each other. For example, in the case of video, the similarity in scene between a current image frame and a previous image frame may be high. According to various embodiments, based on the similarity between images, a current image may be compressed using complexity information associated with a previous image. According to various embodiments, the electronic device 101 may generate compression-related information associated with a plurality of blocks included in an image while compressing the image. For example, the electronic device 101 may generate complexity information about a plurality of blocks. The electronic device 101 may generate complexity information based on information associated with bit allocation for each of a plurality of blocks. The electronic device 101 may generate complexity information based on information associated with a bit plane deleted by compression in association with each of the plurality of blocks. According to various embodiments, the electronic device 101 may generate first attribute information, including information about the complexity of each of the plurality of blocks included in the first image, while compressing the first image according to the first compression scheme. The electronic device 101 may generate second attribute information including information about the complexity of each of the plurality of blocks included in the second image while compressing the second image according to the first compression scheme.

In operation 430, the electronic device 101 may transmit the first image and the second image, compressed according to the first compression scheme, the first attribute information corresponding to the first image, and the second attribute information corresponding to the second image, to the processor 120 using the control circuit 264. The processor (e.g., the processor 120) of the electronic device 101 may receive the compressed first image and the compressed second image from the control circuit 264.

In operation 440, the electronic device 101 (e.g., the processor 120) may decompress the compressed first image and second image, which have been compressed according to the first compression scheme. The electronic device 101 may include a decoder that uses the first compression scheme.

In operations 450 and 460, the electronic device 101 (e.g., the processor 120) may compress the decompressed first image according to a second compression scheme using the first attribute information generated in relation to compressing the first image, and may compress the decompressed second image according to the second compression scheme using the second attribute information generated in relation to compressing the second image. The processor 120 of the electronic device 101 may include an encoder that uses the second compression scheme. The second compression scheme may be determined based on the type of encoder included in the processor 120, and various modifications thereof may be applicable in various embodiments. For example, the second compression scheme may be advanced raw data codec (ARC) encoding.

The first attribute information may include complexity information associated with each of the plurality of blocks included in the first image, and the second attribute information may include complexity information associated with each of the plurality of blocks included in the second image. The electronic device 101 may compress the first image based on the complexity of the first image, and thus compression may be efficiently performed. According to various embodiments, the electronic device 101 may not generate information related to compression while compressing the first image according to the second compression scheme. For example, the electronic device 101 may skip a complexity-measuring operation for the plurality of blocks included in the first image. In this instance, the electronic device 101 may decrease the temporal complexity of an encoder that uses the second compression scheme, and may increase the compression speed of the second compression scheme.

In operation 470, the electronic device 101 (e.g., the processor 120) may transmit the compressed first image and second image, which have been compressed according to the second compression scheme, to an external device (e.g., the server 108 of FIG. 2) using a communication module (e.g., the communication module 190 of FIG. 2). According to various embodiments, the external device may be a cloud server that is capable of applying various computer-visions to an image. The electronic device 101 may compress the first image and the second image, which are large-size and high-quality images, and transmit the compressed images to the external device 108. Accordingly, data storage space may be secured and data transmission costs may be reduced.

Figure 6:
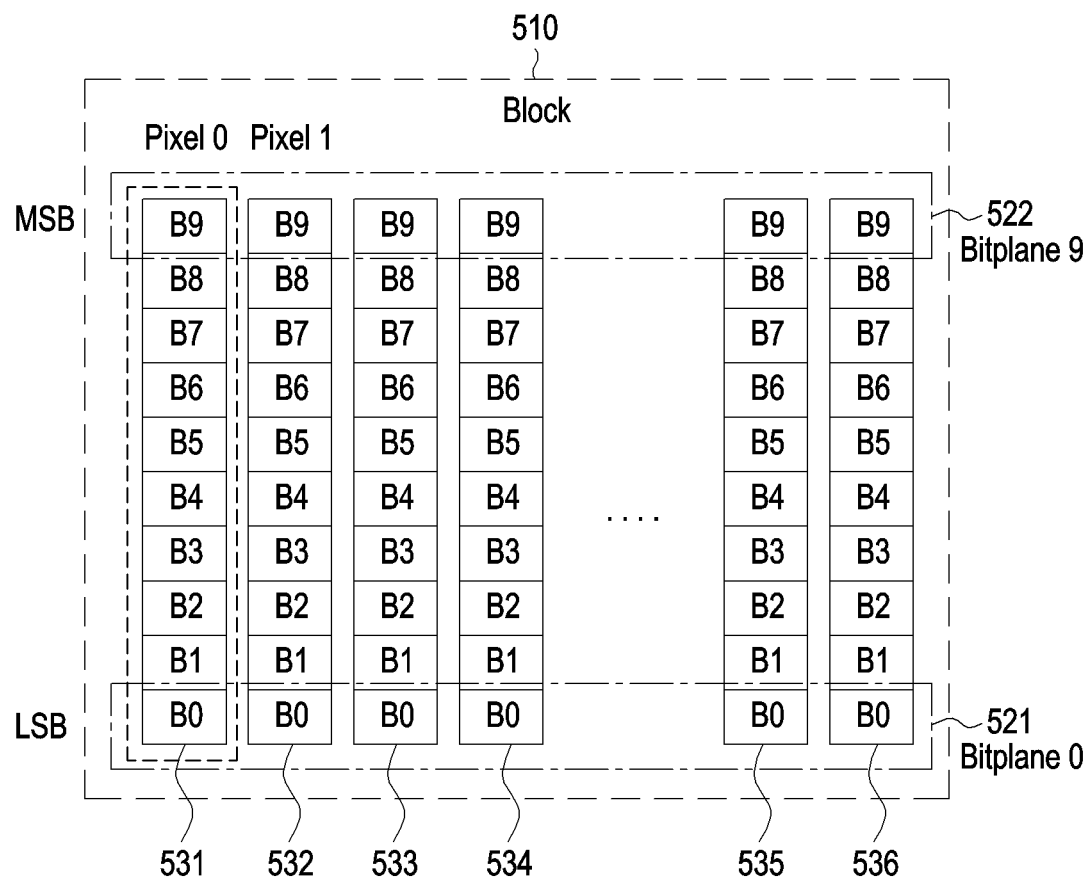
FIG. 6 is a diagram illustrating the structure of an image block in an electronic device according to various embodiments.

FIG. 6 is a diagram illustrating the structure of an image block in an electronic device according to various embodiments. An electronic device (e.g., the electronic device 101 of FIG. 2) according to various embodiments may obtain an image in units of frames using an image sensor (e.g., the image sensor 230 of FIG. 2). For example, an obtained first image may include a plurality of areas (e.g., blocks). The electronic device 101 may process the first image in units of blocks. For example, the electronic device 101 may compress the first image in units of blocks.

Referring to FIG. 6, a first block 510 may include a plurality of pixels 531, 532, 533, 534, 535, and 536. Each pixel may be separated as bits in the range from the least significant bit (B0) to the most significant bit (B9), and each area including bits at the same bit level is referred to as a bit plane. Referring to FIG. 5, the area including bits at the least significant bit level is bit plane 0 521. The area including bits at the most significant bit level is bit plane 9 522. The electronic device 101 may delete at least one bit plane selected from 10 bit planes in ascending order from the least significant bit to the most significant bit, in order to compress the first block 510. For example, if the complexity of the first block 510 is low, the image quality of the first block 510 may not deteriorate even though a large number of bit planes are deleted when the first block 510 is compressed. Alternatively, if the complexity of the first block 510 is high, a small number of bit planes may be deleted when the first block 510 is compressed, in order to maintain the image quality of an image. The number of bit planes to be deleted for each block may be determined based on the compression rate of a compression scheme.

FIG. 7 is a diagram illustrating an example of the complexity of an image according to various embodiments.

FIG. 8 is a diagram illustrating another example of the complexity of an image according to various embodiments.

FIG. 9 is a diagram illustrating another example of the complexity of an image according to various embodiments.

An electronic device (e.g., the electronic device 101 of FIG. 2) according to various embodiments may generate complexity information of each of a plurality of blocks included in an image while compressing the image, and may perform image compression using the complexity information associated with each of the plurality of blocks included in the image. In association with a first image 600, a second image 610, and a third image 620 that the electronic device 101 successively acquires, FIG. 7 illustrates complexity associated with a plurality of blocks included in the first image 600, FIG. 8 illustrates complexity associated with a plurality of blocks included in the second image 610, and FIG. 9 illustrates complexity associated with a plurality of blocks included in the third image 620. As the complexity is higher, a numeric value is set to be higher. As the complexity is lower, a numeric value is set to be lower. For example, the lowest complexity, which is a basis value in FIGS. 7, to 9 is 1.

The complexity of a first block 601 of FIG. 7, the complexity of a first block 611 of FIG. 8, and the complexity of a first block 621 of FIG. 9 are 1, 1, and 2, respectively. In this instance, it is determined that the similarity of the first blocks 601, 611, and 621 in the chronologically sequentially acquired images is high. For example, if the electronic device 101 compresses the first block 611 of the second image 610 using a complexity of 1, which is the complexity of the first block 601 of the first image 600, effective compression may be performed.

The complexity of a $24^{th}$ block 602 of FIG. 7, the complexity of a $24^{th}$ block 612 of FIG. 8, and the complexity of a $24^{th}$ block 622 of FIG. 9 are 4, 1, and 4, respectively. In this instance, it is determined that the similarity of the $24^{th}$ blocks 602, 612, and 621 in the chronologically sequentially acquired images is low. For example, if the electronic device 101 compresses the $24^{th}$ block 612 of the second image 610 using a complexity of 4, which is the complexity of the $24^{th}$ block 602 of the first image 602, effective compression may be difficult.

According to various embodiments, the electronic device 101 may allocate bits to each of the blocks in proportion to complexity in order to perform efficient compression. For example, in FIG. 7, if a large number of bits is allocated to blocks having a complexity of 3 or higher, the image quality of the first image 600 may be maintained.

According to various embodiments, if the electronic device 101 compresses the first image 600 according to a compression scheme that is based on a fixed compression rate, the electronic device 101 may allocate the same number of bits to each of the plurality of blocks included in the first image 600. For example, if a compression rate is 2:1, the number of bits corresponding to half of a block size may be allocated to each block. During compression, the number of bits allocated to each block may be excessive or may be insufficient. If the number of bits is excessive, resources may be wasted. Conversely, if the number of allocated bits is insufficient, data that is needed may be deleted. Alternatively, bits are allocated to the plurality of blocks included in the first image 600 based on the complexity of each block, but the number of bits that can be used for compressing the whole first image 600 may be fixed. In this instance, bits are allocated based on the complexity associated with a previous frame, as opposed to the complexity associated with the first image 600. Accordingly, the number of allocated bits may be excessive or insufficient while each block is compressed. According to various embodiments, the electronic device 101 may generate, as attribute information, information associated with a bit allocated to each of a plurality of blocks included in an image while compression is performed.

Figure 10:
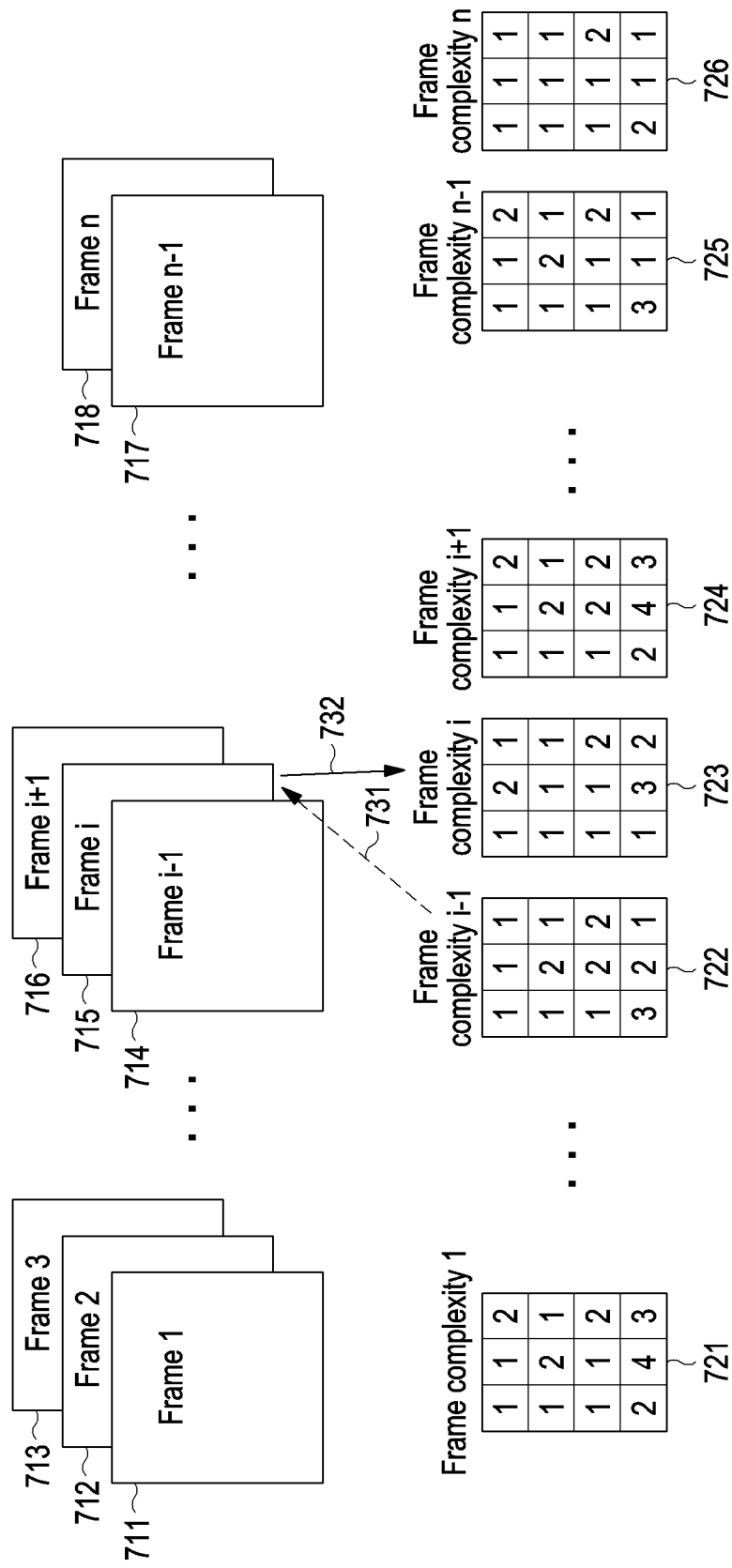
FIG. 10 is an example of a conceptual diagram illustrating a method of compressing an image by an electronic device according to various embodiments.

FIG. 10 is an example of a conceptual diagram illustrating a method of compressing an image in an electronic device according to various embodiments.

Figure 11:
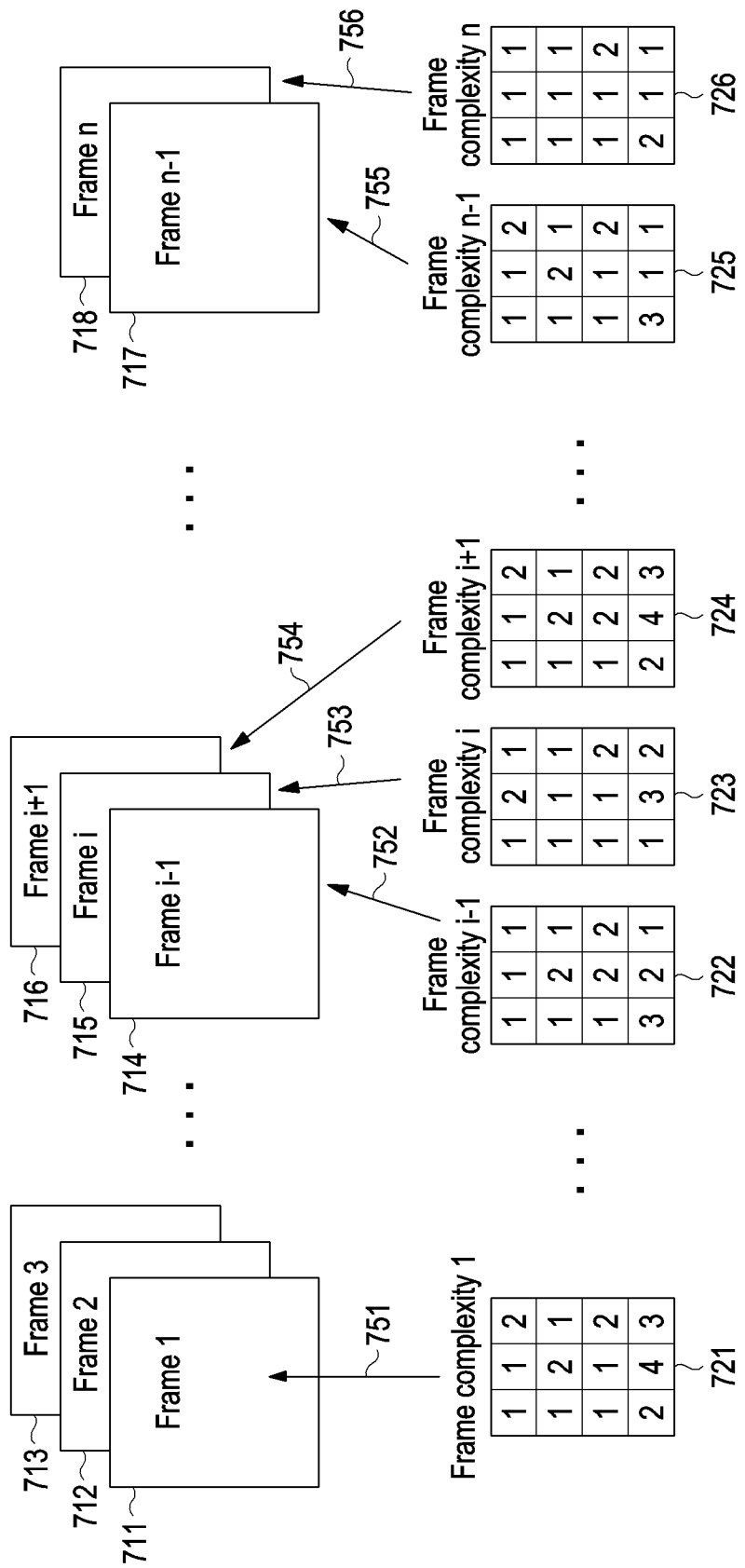
FIG. 11 is another example of a conceptual diagram illustrating a method of compressing an image by an electronic device according to various embodiments.

FIG. 11 is another example of a conceptual diagram illustrating a method of compressing an image in an electronic device according to various embodiments.

An electronic device (e.g., the electronic device 101 of FIG. 2) according to various embodiments may use attribute information associated with an image in order to perform image compression. For example, the electronic device 101 may perform image compression using complexity associated with a plurality of blocks included in an image of FIGS. 7 to 8. Referring to FIG. 10, the electronic device 101 may compress an image acquired by an image sensor (e.g., the image sensor 230 of FIG. 2) according to a first compression scheme using a control circuit (e.g., the control circuit 264 of FIG. 2) connected to the image sensor 230. Referring to FIG. 11, the electronic device 101 may decompress the image compressed by the control circuit 264 using a processor (e.g., the processor 120), and may compress the image again according to a second compression scheme, which is different from the first compression scheme.

According to various embodiments, the image sensor 230 may acquire an image in units of frames. Referring to FIG. 10, sequential images acquired by the image sensor 230 may be frame 1 711, frame 2 712, frame 3 713, . . . , frame i−1 714, frame i 715, frame i+1 716, . . . , frame n−1 717, and frame n 718, which correspond to the images. The control circuit 264 may compress each of n frames according to the first compression scheme, and may generate complexity information about each frame (frame complexity 1 721, . . . , frame complexity i−1 722, frame complexity i 723, frame complexity i+1 724, . . . , frame complexity n−1 725, and frame complexity n 726). For example, the control circuit 264 may compress frame 1 711, and may generate the frame complexity i 721 including complexity associated with a plurality of blocks included in the frame 1 711. The frame complexity may include the complexity associated with each of a plurality of blocks included in each frame.

According to various embodiments, the control circuit 264 may compress the frame i 715 according to the first compression scheme using the frame complexity i−1 722 in operation 731, and may generate the frame complexity i 723 while compressing the frame i 715 in operation 732. Since the complexity of the frame i 715 is not known at the point in time at which the control circuit 264 compresses the frame i 715, the complexity of the previous frame may be utilized. According to various embodiments, the electronic device 101 may transmit, to the processor 120, attribute information associated with a frame that the control circuit 264 generates and a compressed frame.

According to various embodiments, referring to FIG. 11, the processor 120 may use the complexity of a frame received from the control circuit 264 when compressing the corresponding frame according to the second compression scheme. For example, the processor 120 may compress the frame 1 711 according to the second compression scheme using the frame complexity 1 721 in operation 751. The processor 120 may not calculate the complexity associated with a plurality of blocks included in the frame while compressing the frame 1 711. In operation 752, the processor 120 may compress the frame i−1 714 according to the second compression scheme using the frame complexity i−1 722 in operation 752. Based on the complexity information associated with n frames, the processor 120 may calculate the total complexity of all frames and the complexity of each frame. Based on the total complexity, the processor 120 may efficiently allocate a bit to each frame. The processor 120 may obtain complexity information associated with a frame that is to be compressed before compressing the frame, and may perform efficient compression using the obtained complexity information associated with the frame to be compressed.

Compared to FIG. 10, referring to FIG. 11, the processor 120 of the electronic device 101 may compress each frame based on the complexity information associated with the corresponding frame, and thus the compression according to the second compression method may be more efficiently performed than the compression according to the first compression method.

Figure 12:
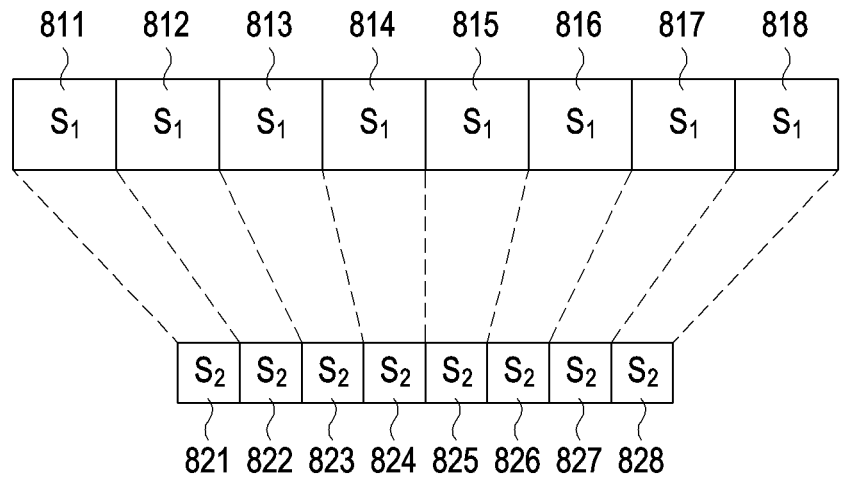
FIG. 12 is an example of a conceptual diagram illustrating a method of compressing an image by an electronic device according to various embodiments.

FIG. 12 is an example of a conceptual diagram illustrating a method of compressing an image in an electronic device according to various embodiments.

Figure 13:
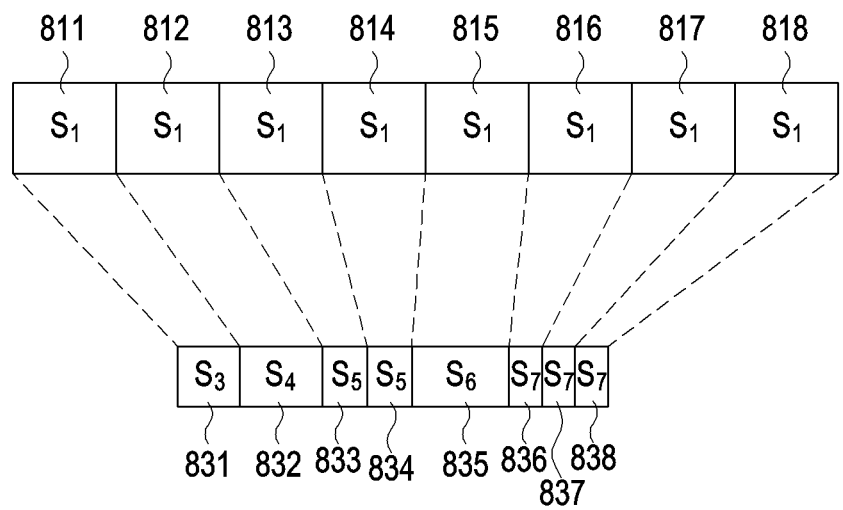
FIG. 13 is another example of a conceptual diagram illustrating a method of compressing an image by an electronic device according to various embodiments.

FIG. 13 is another example of a conceptual diagram illustrating a method of compressing an image in an electronic device according to various embodiments.

The electronic device (e.g., the electronic device 101 of FIG. 2) according to various embodiments may perform compression in units of multiple blocks included in an image. The area of a block (e.g., blocks 811 to 818, blocks 821 to 828, and blocks 831 to 838) in FIGS. 12 and 13 may be a bit size.

Referring to FIG. 12, in association with 8 blocks 811 to 818 included in a first image, the electronic device 101 may allocate bits according to a compression rate. For example, if the size of a block (blocks 811 to 818) is $S_1$ and the compression rate is 2:1, the electronic device 101 may allocate bits corresponding to $S_2$, which is ½ of $S_1$, to each of the blocks 821 to 828. Depending on the embodiment, the compression rate may be satisfied but the number of bits needed for compressing each block may be different, and thus, efficient compression may be difficult. Furthermore, in the case of associating a plurality of images with the plurality of blocks 811 to 818 of FIG. 12, if the same number of bits is allocated to each image, compression efficiency may be lowered. According to various embodiments, if the electronic device 101 performs compression according to the first compression scheme using a control circuit (e.g., the control circuit 264 of FIG. 2), the same number of bits may be allocated to each block, as illustrated in FIG. 12.

Referring to FIG. 13, in association with 8 blocks 811 to 818 included in the first image, the electronic device 101 may allocate bits according to a compression rate, and may allocate bits to each block differently by taking into consideration the complexity of each block based on the total bit size associated with the compressed blocks. For example, the electronic device 101 may allocate a relatively large number of bits to some blocks (e.g., blocks 832 and 835) than to other blocks, in association with blocks 812 and 815, which have relatively high complexity. Furthermore, in the case of associating a plurality of images with the plurality of blocks 811 to 818 of FIG. 13, the bit size of bits allocated to each image may be changed by taking into consideration the complexity of each image. According to various embodiments, if the electronic device 101 performs compression according to the second compression scheme using a processor (e.g., the processor 120 of FIG. 2), bits may be allocated to each block based on the complexity of each block, as illustrated in FIG. 13.

Figure 14:
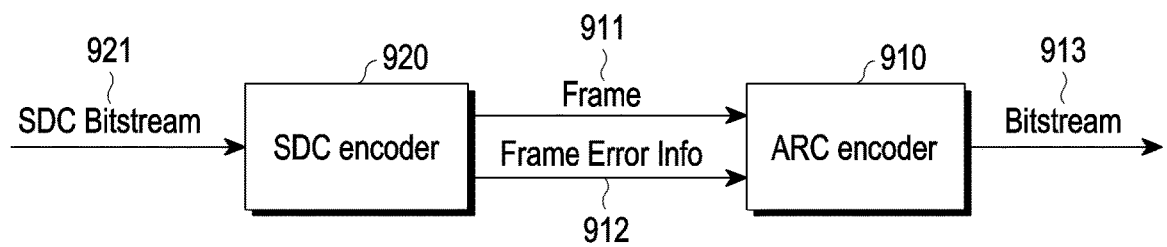
FIG. 14 is a conceptual diagram illustrating a method of compressing an image by an electronic device according to various embodiments.

FIG. 14 is a conceptual diagram illustrating a method of compressing an image by an electronic device according to various embodiments.

Figure 15:
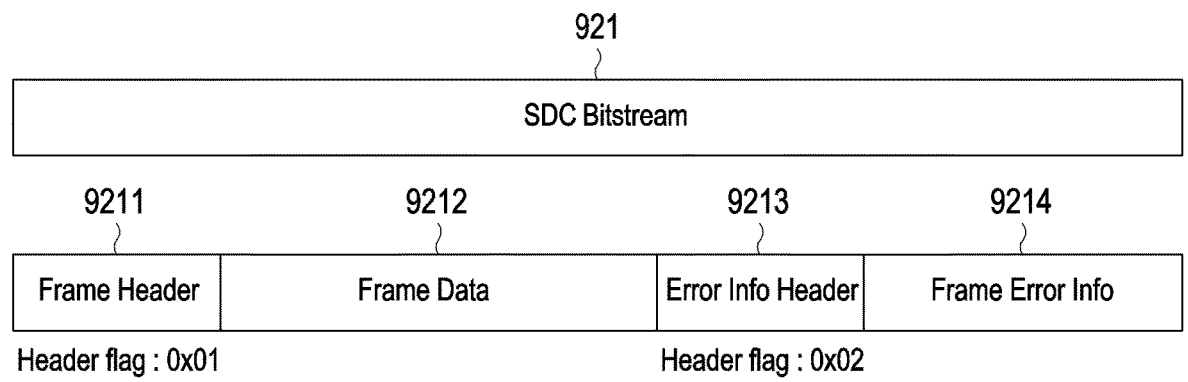
FIG. 15 is a conceptual diagram illustrating the data structure of a compressed image generated by an electronic device according to various embodiments.

FIG. 15 is a conceptual diagram illustrating the data structure of a compressed image generated by an electronic device according to various embodiments.

An electronic device (e.g., the electronic device 101 of FIG. 2) according to various embodiments may primarily compress an image (e.g., a first frame) acquired by an image sensor (e.g., the image sensor 230 of FIG. 2), according to the first compression scheme via a control circuit (e.g., the control circuit 264 of FIG. 2) connected to the image sensor 230 in order to transmit the image to a processor (e.g., the processor 120 of FIG. 2) of the electronic device 101. The control circuit 264 may compress a first frame, and may transmit the compressed first frame including attribute information that is generated in relation to the compression, to the processor 120. FIG. 14 illustrates a conceptual diagram illustrating a method in which the electronic device 101 (e.g., the processor 120) according to various embodiments compresses a first frame again, which has been compressed according to the first compression scheme, according to a second compression scheme. The control circuit 264 may transmit, to the processor 120, an SDC bitstream including the compressed first frame and attribute information (e.g., frame error information) associated with the first frame. An ARC encoder 910 included in the processor 120 may compress the first frame, which has been compressed according to the first compression scheme, according to the second compression scheme. The processor 120 may decompress the first frame, which has been compressed according to the first compression scheme, before compressing the first frame again according to the second compression scheme. An SDC decoder 920 included in the processor 120 may separate the compressed first frame and the attribute information (e.g., frame error information) associated with the first frame which are included in the SDC bitstream 921 received from the control circuit 264. The SDC bitstream generated by the control circuit 264 may have the structure shown in FIG. 15.

Referring to FIG. 15, the SDC bitstream 921 may include information associated with the compressed first frame and the attribute information of the first frame. For example, the information associated with the compressed first frame may include a header 9211 associated with the first frame and a payload 9212 including the compressed first frame information. The attribute information of the compressed first frame may include a header 9213 associated with the attribute information and a payload 9214 including the attribute information. In the SDC bitstream 921, the header flag value of the header 9211 of the first frame is 0x01, and the header flag value of the header 9213 of the attribute information may be set to 0x02. Referring to FIG. 14, the SDC decoder 920 may separate the compressed first frame data 9212 and data 9214 associated with the attribute information using the header flag value of the SDC bitstream 921. The position of the attribute information of the first frame in the data frame of FIG. 15 is merely an example, and those skilled in the art may understand that the position of the attribute information of an image in a data frame is not limited.

The SDC decoder 920 may decompress the compressed first frame data according to an SDC compression scheme so as to generate a reconstructed image (reconstruction image). The SDC decoder 920 may transmit a reconstructed first frame 911 and attribute information 912 (e.g., frame error information) of the first frame to the ARC encoder 910. According to various embodiments, the SDC decoder 920 may transmit, to the ARC encoder 910, only the reconstructed first frame 911, without the attribute information 912 associated with the first frame. In this instance, the description will be provided with reference to FIG. 16.

Figure 16:
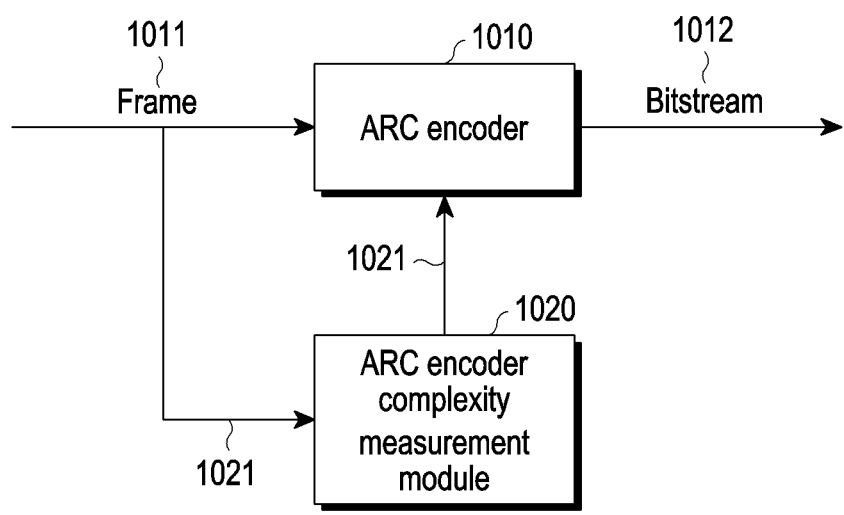
FIG. 16 is a conceptual diagram illustrating a method of again compressing a restored image by an electronic device according to various embodiments.

FIG. 16 is a conceptual diagram illustrating a method in which the electronic device 101 according to various embodiments compresses a reconstructed image again. If the electronic device 101 does not receive attribute information associated with a reconstructed first frame, the electronic device 101 may compress a first frame again and may generate complexity information associated with the reconstructed first frame. For example, in the electronic device 101, the ARC encoder 1010 receives a first frame 1011, and may compress the first frame 1011 according to an ARC compression scheme so as to generate a bitstream 1012 based on ARC compression. The electronic device 101 may receive a first frame 1021 using an ARC encoder complexity measurement module 1020, may determine the complexity of each of a plurality of blocks included in the first frame 1021, and may generate attribute information including the complexity information of the first frame 1021.

Referring to FIG. 14, the ARC encoder 910 may compress the first frame 911 according to the ARC compression scheme using the attribute information 912 associated with the first frame. The first frame compressed according to the ARC compression scheme may be transmitted in the form of a bitstream 913 to an external electronic device.

Figure 17:
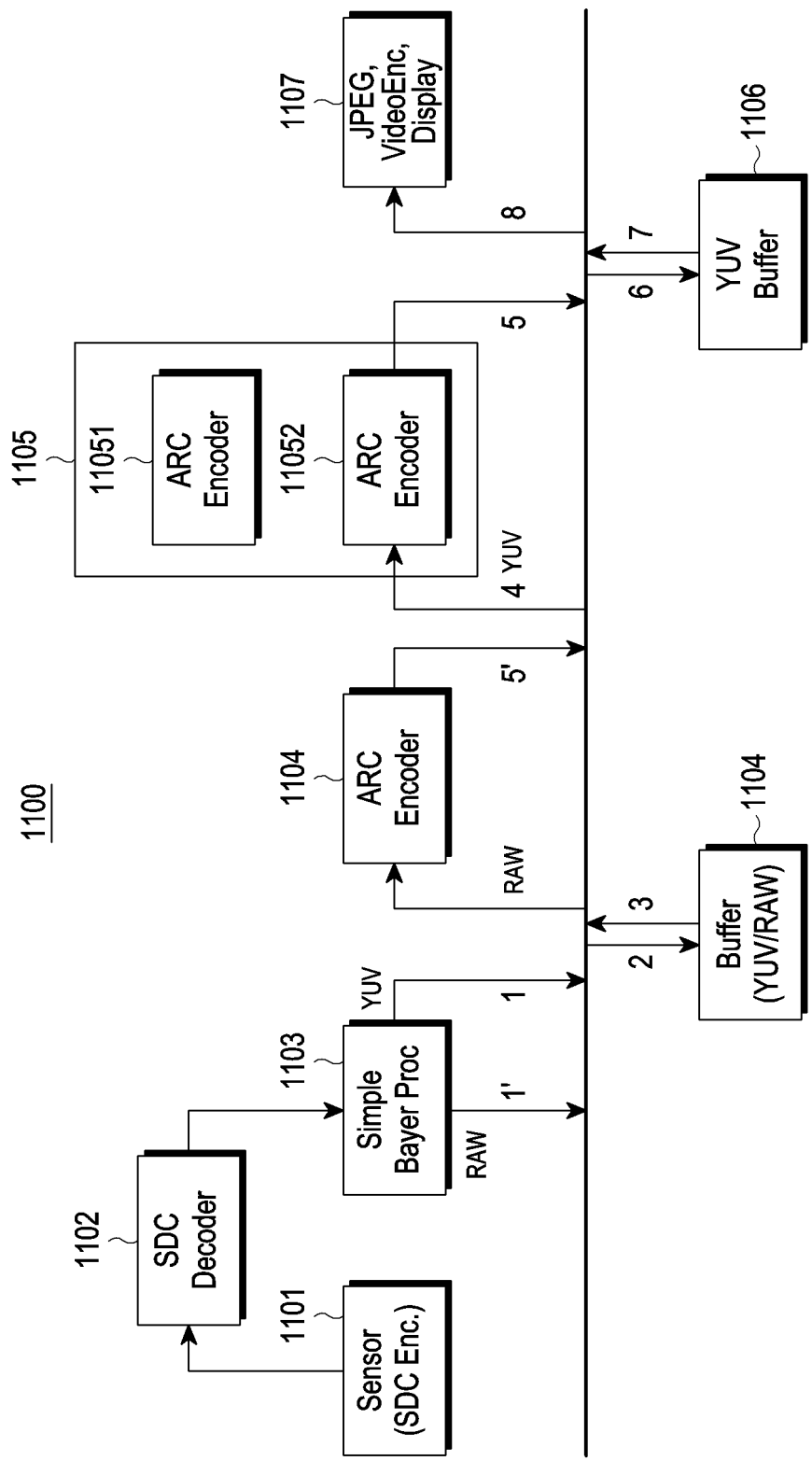
FIG. 17 is a conceptual diagram illustrating a method of compressing a video by an electronic device according to various embodiments.

FIG. 17 is a conceptual diagram 1100 illustrating a method of compressing a video by an electronic device according to various embodiments. In the case in which an image is a video, the operation of the electronic device (e.g., the electronic device 101 of FIG. 2) according to various embodiments will be described with reference to FIG. 17. The electronic device 101 may include a sensor 1101, an SDC decoder 1102, a simple Bayer processor 1103, a buffer 1104, an ARC encoder 1104, an ISP 1105, a full Bayer processor 11051, a YUV image processor 11052, a YUV buffer 1106, and a video encoder or a display 1107.

The sensor 1101 may acquire a raw image, and may compress the acquired raw image using an SDC encoder included in the sensor 1101. The compressed raw image (e.g., an SDC bitstream) may be transmitted to an SDC decoder 1102 connected to the sensor 1101. The SDC decoder 1102 may decompress the compressed image so as to generate the raw image again (RAW). The electronic device 101 may convert the decompressed raw image into YUV using the simple Bayer processor 1103. The raw image and the YUV obtained via conversion may be stored in the buffer 1104. The YUV image processor 11052 may perform YUV image processing with respect to the YUV obtained via conversion. The YUV image to which the YUV image processing is performed may be stored in the YUV buffer 1106.

A bitstream that is generated after the ARC encoder 1104 performs ARC compression of the raw image may be transmitted to a cloud server.

Figure 18:
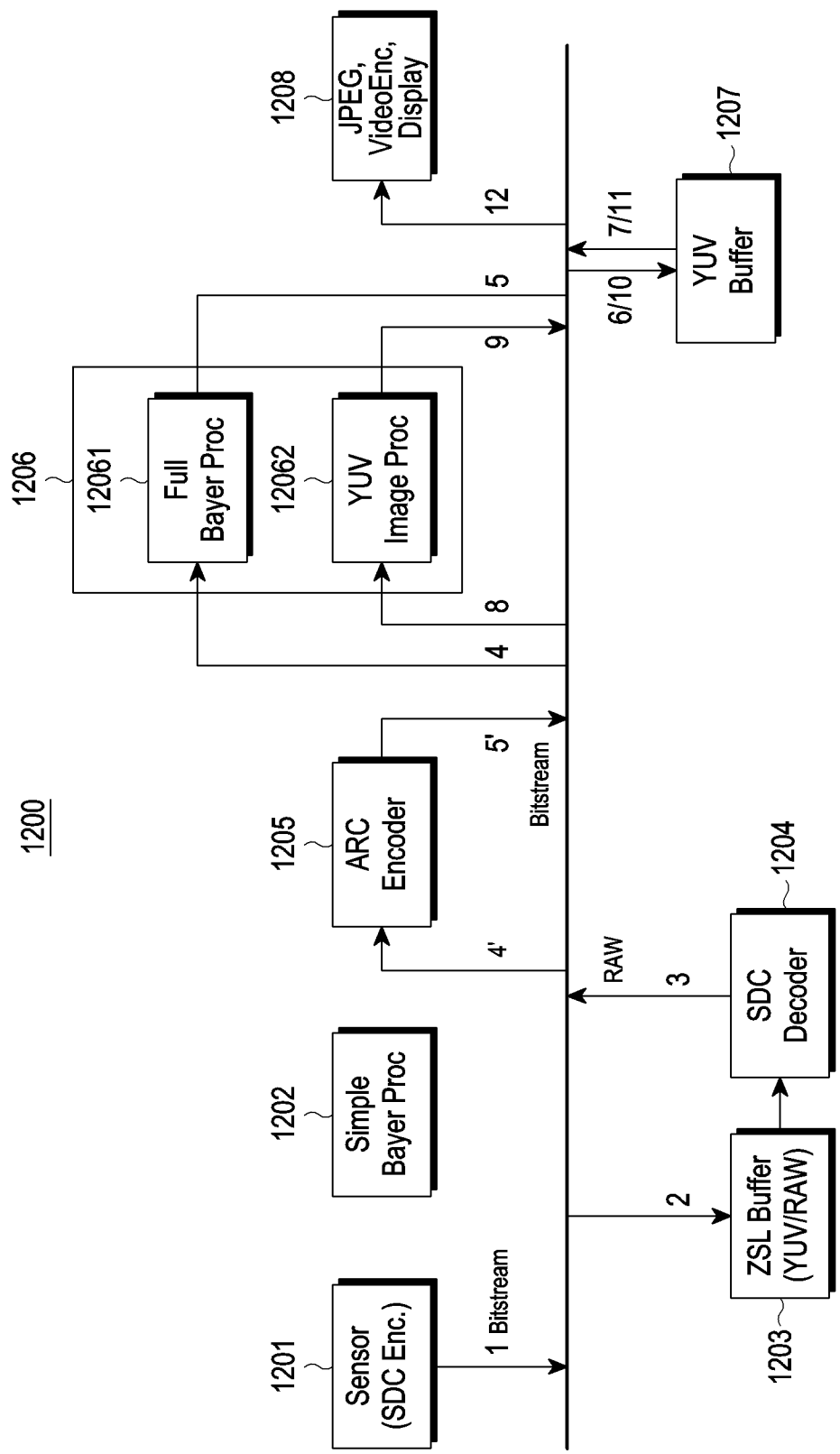
FIG. 18 is a conceptual diagram illustrating a method of compressing a still image by an electronic device according to various embodiments.

FIG. 18 is a conceptual diagram 1200 illustrating a method of compressing a still image by an electronic device according to various embodiments. In the case in which an image is a still image, the operation of the electronic device (e.g., the electronic device 101 of FIG. 2) according to various embodiments will be described with reference to FIG. 12. The electronic device 101 may include a sensor 1201, a ZSL buffer 1203, an SDC decoder 1204, a simple Bayer processor 1202, an ARC encoder 1205, an ISP 1206, a full Bayer processor 12061, a YUV image processor 12062, a YUV buffer 1207, and a display 1208.

A raw image may be compressed according to the SDC compression scheme in the sensor 1201, and may be transmitted in the form of a bitstream to the processor (e.g., the processor 261 or the processor 120 of FIG. 2) of the electronic device 101. The transmitted bitstream may be stored in the ZSL buffer 1203. The compressed raw image stored in the ZSL buffer 1203 may be decompressed by the SDC decoder 1204. The decompressed raw image may be converted into a YUV image by the full Bayer processor 12061, and may be stored in the YUV buffer 1207. The YUV image stored in the YUV buffer 1207 may be YUV image-processed by the YUV image processor 12062. The YUV image on which the YUV image processing has been performed may be JPEG-compressed by a JPEG encoder, and may be stored as a JPEG image. The display 1208 may display the JPEG image.

The decompressed raw image may be ARC-compressed by the ARC encoder 1205, and the compressed bitstream may be transmitted to a cloud server.

An electronic device (e.g., the electronic device 101 of FIG. 1 or the electronic device 101 of FIG. 2) according to various embodiments may include: a communication module (e.g., the communication module 190 of FIG. 1 or the communication module 190 of FIG. 2); an image sensor (e.g., the image sensor 230 of FIG. 2); a control circuit (e.g., the control circuit 264 of FIG. 2), electrically connected to the image sensor 230 and configured to sequentially acquire a first image and a second image using the image sensor 230, to compress the first image according to a first compression scheme using attribute information generated in relation to compressing an image acquired before acquisition of the first image, to compress the second image according to the first compression scheme using first attribute information generated in relation to compressing the first image, and to generate second attribute information in relation to compressing the second image; and a processor (e.g., the processor 120 of FIG. 1 or the processor 120 of FIG. 2) electrically connected to the control circuit 264 and the communication module 190, wherein the processor 120 may be configured to: acquire, from the control circuit 264, the first image compressed according to the first compression scheme and the second image compressed according to the first compression scheme; decompress the first image compressed according to the first compression scheme and the second image compressed according to the first compression scheme; compress the decompressed first image according to a second compression scheme using the first attribute information; compress the decompressed second image according to the second compression scheme using the second attribute information; and transmit the first image compressed according to the second compression scheme and the second image compressed according to the second compression scheme to an external device (e.g., the electronic device 104 of FIG. 1, the server 108, or the server 108 of FIG. 2) using the communication module 190.

According to various embodiments, the first attribute information may include information about the complexity of each of a plurality of blocks included in the first image, and the second attribute information may include information about the complexity of each of a plurality of blocks included in the second image.

According to various embodiments, the complexity of each of the plurality of blocks included in the first image may include information associated with a bit plane that is associated with the plurality of blocks of the first image and is deleted when the first image is compressed according to the first compression scheme, the control circuit (e.g., the control circuit 264 of FIG. 2) may be configured to compress the second image according to the first compression scheme, using the information associated with the deleted bit plane of the plurality of blocks of the first image, and the processor (e.g., the processor 120 of FIG. 1 or the processor 120 of FIG. 2) may be configured to compress the decompressed first image according to the second compression scheme using the information associated with the deleted bit plane of the plurality of blocks of the first image.

According to various embodiments, the complexity of each of the plurality of blocks included in the first image may include information associated with bit allocation for each of the plurality of blocks of the first image, the control circuit (e.g., the control circuit 264 of FIG. 2) may be configured to compress the second image according to the first compression scheme using the information associated with bit allocation for each of the plurality of blocks of the first image, and the processor (e.g., the processor 120 of FIG. 1 or the processor 120 of FIG. 2) may be configured to compress the decompressed first image according to the second compression scheme using the information associated with bit allocation for each of the plurality of blocks of the first image.

According to various embodiments, the control circuit (e.g., the control circuit 264 of FIG. 2) may be configured to allocate a larger number of bits to each of the plurality of blocks included in the second image as the complexity of each of the plurality of blocks included in the first image is higher, and the processor (e.g., the processor 120 of FIG. 1 or the processor 120 of FIG. 2) may be configured to allocate a larger number of bits to each of the plurality of blocks included in the first image as the complexity of each of the plurality of blocks included in the first image is higher.

According to various embodiments, the compression rate of the first compression scheme may be lower than the compression rate of the second compression scheme.

According to various embodiments, the processor (e.g., the processor 120 of FIG. 1 or the processor 120 of FIG. 2) may determine, based on the data transmission speed of the communication module (e.g., the communication module 190 of FIG. 1), the compression rate of the second compression scheme.

According to various embodiments, the control circuit (e.g., the control circuit 264 of FIG. 2) may determine the compression rate of the first compression scheme based on the speed of data transmission between the control circuit 264 and the processor (e.g., the processor 120 of FIG. 1 or the processor 120 of FIG. 2).

An operation method of an electronic device (e.g., the electronic device 101 of FIG. 1) according to various embodiments may include: receiving a first image and a second image sequentially acquired using an image sensor; compressing the first image according to a first compression scheme using attribute information generated in relation to compressing an image acquired before acquisition of the first image, compressing the second image according to the first compression scheme using first attribute information generated in relation to compressing the first image, and generating second attribute information in relation to compressing the second image; receiving, by a processor of the electronic device, the first image compressed according to the first compression scheme and the second image compressed according to the first compression scheme, from the image sensor; decompressing the first image compressed according to the first compression scheme and the second image compressed according to the first compression scheme; compressing the decompressed first image according to a second compression scheme using the first attribute information generated in relation to compressing the first image, and compressing the decompressed second image according to the second compression scheme using the second attribute information generated in relation to compressing the second image; and transmitting the first image compressed according to the second compression scheme and the second image compressed according to the second compression scheme to an external electronic device using the communication module (e.g., the communication module 190).

According to various embodiments, the first attribute information may include information about the complexity of each of a plurality of blocks included in the first image and information about the complexity of each of a plurality of blocks included in the second image.

According to various embodiments, the information about the complexity of each of the plurality of blocks included in the first image may include information associated with a bit plane that is associated with the plurality of blocks of the first image and is deleted when the first image is compressed according to the first compression scheme, the control circuit (e.g., the control circuit 264) may be configured to compress the second image according to the first compression scheme using the information associated with the deleted bit plane of the plurality of blocks of the first image, and the processor (e.g., the processor 120) may be configured to compress the first image according to the second compression scheme using the information associated with the deleted bit plane of the plurality of blocks of the first image.

According to various embodiments, the complexity of each of the plurality of blocks included in the first image may include information associated with bit allocation for each of the plurality of blocks of the first image, the control circuit (e.g., the control circuit 264) may be configured to compress the second image according to the first compression scheme using the information associated with the bit allocation for each of the plurality of blocks of the first image, and the processor (e.g., the processor 120) may be configured to compress the decompressed first image according to the second compression scheme using the information associated with bit allocation for each of the plurality of blocks of the first image.

According to various embodiments, the control circuit (e.g., the control circuit 264) may be configured to allocate a larger number of bits to each of the plurality of blocks included in the second image as the complexity of each of the plurality of blocks included in the first image is higher, and the processor (e.g., the processor 120) may be configured to allocate a larger number of bits to each of the plurality of blocks of the first image as the complexity of each of the plurality of blocks included in the first image is higher.

According to various embodiments, the compression rate of the first compression scheme may be lower than the compression rate of the second compression scheme.

According to various embodiments, the compression rate of the second compression scheme may be determined based on the data transmission speed of the communication module (e.g., the communication module 190).

According to various embodiments, the compression rate of the first compression scheme may be determined according to the speed of the data transmission between the control circuit (e.g., the control circuit 264) and the processor (e.g., the processor 120).

An electronic device (e.g., the electronic device 101) according to various embodiments may include an image sensor (e.g., the image sensor 230), a communication module (e.g., the communication module 190), a control circuit (e.g., the control circuit 264) electrically connected to the image sensor 230 and configured to: compress an image acquired by the image sensor 230 according to a first compression scheme; and generate first data including the compressed image and attribute information which is associated with the image and is generated in relation to the compression, and a processor (e.g., the processor 120) electrically connected to the control circuit 264 and the communication module 190. The processor 120 may be configured to: acquire the first data from the control circuit 264; separate the attribute information and the compressed image from the first data; decompress the compressed image, compress the decompressed image to be smaller than the compressed image according to the second compression scheme using the attribute information; and transmit the image compressed according to the second compression scheme to an external device using the communication module 190.

According to various embodiments, the attribute information, which is associated with the image and is generated in relation to the compression, may include the complexity of each of a plurality of blocks included in the image.

According to various embodiments, the first data may include a first header associated with the attribute information and a second header associated with the compressed image.

According to various embodiments, the processor (e.g., the processor 120) may separate the attribute information and the compressed image from the first data based on the first header and the second header included in the first data.

An electronic device (e.g., the electronic device 101) according to various embodiments may include: a communication module (e.g., the communication module 190); an image sensor (e.g., the image sensor 230); a control circuit (e.g., the control circuit 264) electrically connected to the image sensor 230, wherein the control circuit 264 sequentially acquires a first image and a second image using the image sensor 230, compresses the first image according to a first compression scheme, and compresses a second image according to the first compression scheme using first compression information generated in relation to the compression of the first image; and a processor (e.g., the processor 120) electrically connected to the control circuit 264 and the communication module 190, wherein the processor 120 may be configured to: receive the first image, compressed according to the first compression scheme, and the second image, compressed according to the first compression scheme, from the control circuit 264; decompress the first image, compressed according to the first compression scheme, and the second image, compressed according to the first compression scheme, based at least on the first compression information; compress the decompressed first image according to the second compression scheme using the first compression information; compress the decompressed second image according to the second compression scheme using second compression information generated in relation to compression of the first image; and transmit the first image, compressed according to the second compression scheme, and the second image, compressed according to the second compression scheme, to an external device using the communication module 190.

Embodiments disclosed in the document are provided in order to describe the technical contents and help understanding of the same, and do not limit the scope of the disclosure. Therefore, it should be understood that the scope of the disclosure includes all modifications based on the technical ideal of the disclosure or various other embodiments.

The invention claimed is:

1. An electronic device comprising:
a communication module;
an image sensor;
a control circuit, electrically connected to the image sensor and configured to: sequentially acquire a first image and a second image using the image sensor, compress the first image by a first compression scheme using attribute information generated in relation to compressing an image, the attribute information being acquired before acquisition of the first image, compress the second image by the first compression scheme using first attribute information generated in relation to compressing the first image, and generate second attribute information in relation to compressing the second image; and
a processor electrically connected to the control circuit and the communication module,
wherein the processor is configured to:
acquire, from the control circuit, the first image compressed by the first compression scheme and the second image compressed by the first compression scheme,
decompress the first image compressed by the first compression scheme and the second image compressed by the first compression scheme,
compress the decompressed first image by a second compression scheme using the first attribute information,
compress the decompressed second image by the second compression scheme using the second attribute information, and
transmit the first image compressed by the second compression scheme, and the second image compressed by the second compression scheme, to an external device using the communication module.

2. The electronic device of claim 1, wherein the first attribute information comprises a complexity of each of a plurality of blocks included in the first image, and the second attribute information comprises a complexity of each of a plurality of blocks included in the second image.

3. The electronic device of claim 2, wherein the complexity of each of the plurality of blocks included in the first image comprises information associated with a bit plane of the plurality of blocks of the first image that is deleted when the first image is compressed by the first compression scheme,
wherein the control circuit is configured to compress the second image by the first compression scheme using the information associated with the deleted bit plane of the plurality of blocks of the first image, and
wherein the processor is configured to compress the decompressed first image by the second compression scheme using the information associated with the deleted bit plane of the plurality of blocks of the first image.

4. The electronic device of claim 2, wherein the complexity of each of the plurality of blocks included in the first image comprises information associated with bit allocation for each of the plurality of blocks of the first image,
wherein the control circuit is configured to compress the second image by the first compression scheme using the information associated with bit allocation for each of the plurality of blocks of the first image, and
wherein the processor is configured to compress the decompressed first image by the second compression scheme using the information associated with bit allocation for each of the plurality of blocks of the first image.

5. The electronic device of claim 4, wherein the control circuit is configured to allocate a larger number of bits to each of the plurality of blocks included in the second image as the complexity of each of the plurality of blocks included in the first image increases, and
wherein the processor is configured to allocate a larger number of bits to each of the plurality of blocks included in the first image as the complexity of each of the plurality of blocks included in the first image is higher.

6. The electronic device of claim 1, wherein a compression rate of the first compression scheme is lower than a compression rate of the second compression scheme.

7. The electronic device of claim 1, wherein the processor is configured to determine, based on a data transmission speed of the communication module, a compression rate of the second compression scheme.

8. The electronic device of claim 1, wherein the control circuit is configured to determine a compression rate of the first compression scheme, based on a speed of data transmission between the control circuit and the processor.

9. An operation method of an electronic device, the method comprising:
receiving a first image and a second image sequentially acquired using an image sensor;
compressing the first image by a first compression scheme using attribute information generated in relation to compressing an image, the attribute information being acquired before acquisition of the first image, compressing the second image by the first compression scheme using first attribute information generated in relation to compressing the first image, and generating second attribute information in relation to compressing the second image;
receiving, by a processor of the electronic device, the first image, compressed by the first compression scheme, and the second image, compressed by the first compression scheme, from the image sensor;
decompressing the first image compressed by the first compression scheme and the second image compressed by the first compression scheme;
compressing the decompressed first image by a second compression scheme using the first attribute information generated in relation to compressing the first image, and compressing the decompressed second image by the second compression scheme using the second attribute information generated in relation to compressing the second image; and
transmitting the first image, compressed by the second compression scheme, and the second image, compressed by the second compression scheme, to an external electronic device using the communication module.

10. The method of claim 9, wherein the first attribute information comprises a complexity of each of a plurality of blocks included in the first image and a complexity of each of a plurality of blocks included in the second image.

11. The method of claim 10, wherein the complexity of each of the plurality of blocks included in the first image comprises information associated with a bit plane of the plurality of blocks of the first image that is deleted when the first image is compressed by the first compression scheme,
wherein the control circuit is configured to compress the second image by the first compression scheme using the information associated with the deleted bit plane of the plurality of blocks of the first image, and
wherein the processor is configured to compress the first image by the second compression scheme using the information associated with the deleted bit plane of the plurality of blocks of the first image.

12. The method of claim 10, wherein the complexity of each of the plurality of blocks included in the first image comprises information associated with bit allocation for each of the plurality of blocks of the first image,
wherein the control circuit is configured to compress the second image by the first compression scheme using the information associated with the bit allocation for each of the plurality of blocks of the first image, and
wherein the processor is configured to compress the decompressed first image by the second compression scheme using the information associated with bit allocation for each of the plurality of blocks of the first image.

13. The method of claim 12, wherein the control circuit is configured to allocate a larger number of bits to each of the plurality of blocks included in the second image as the complexity of each of the plurality of blocks included in the first image is higher, and
wherein the processor is configured to allocate a larger number of bits to each of the plurality of blocks included in the first image as the complexity of each of the plurality of blocks included in the first image is higher.

14. The method of claim 9, wherein a compression rate of the first compression scheme is lower than a compression rate of the second compression scheme.

15. The method of claim 9, wherein a compression rate of the second compression scheme is determined based on a data transmission speed of the communication module.

* * * * *